United States Patent
Cho et al.

(10) Patent No.: US 11,030,724 B2
(45) Date of Patent: Jun. 8, 2021

(54) METHOD AND APPARATUS FOR RESTORING IMAGE

(71) Applicant: SAMSUNG ELECTRONICS CO., LTD., Suwon-si (KR)

(72) Inventors: Yang Ho Cho, Seongnam-si (KR); Deokyoung Kang, Suwon-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 16/506,423

(22) Filed: Jul. 9, 2019

(65) Prior Publication Data

US 2020/0090306 A1 Mar. 19, 2020

Related U.S. Application Data

(60) Provisional application No. 62/730,641, filed on Sep. 13, 2018.

(30) Foreign Application Priority Data

Dec. 3, 2018 (KR) ........................ 10-2018-0153829

(51) Int. Cl.
*G06T 5/00* (2006.01)
*G06N 20/10* (2019.01)
(Continued)

(52) U.S. Cl.
CPC ............ *G06T 5/001* (2013.01); *G02B 3/0037* (2013.01); *G06N 3/08* (2013.01); *G06N 20/10* (2019.01);
(Continued)

(58) Field of Classification Search
CPC . G06T 5/001; G06T 5/30; G06T 2207/20081; G06T 2207/20084;
(Continued)

(56) References Cited

U.S. PATENT DOCUMENTS

| 7,009,652 B1 | 3/2006 | Tanida et al. |
| 7,412,107 B2 | 8/2008 | Milanfar et al. |

(Continued)

FOREIGN PATENT DOCUMENTS

| JP | 2013-145981 A | 7/2013 |
| JP | 2017-139576 A | 8/2017 |

(Continued)

OTHER PUBLICATIONS

Communication dated Nov. 27, 2019, issued by the European Patent Office in counterpart European Application No. 19193566.7.
(Continued)

*Primary Examiner* — Phuoc Tran
(74) *Attorney, Agent, or Firm* — Sughrue Mion, PLLC

(57) ABSTRACT

Provided is an image restoration apparatus and method. The image restoration apparatus may store an image restoration model including a convolutional layer corresponding to kernels having various dilation gaps, and may restore an output image from a target image obtained by rearranging a compound eye vision (CEV) image by the image restoration model.

19 Claims, 18 Drawing Sheets

(51) Int. Cl.
G02B 3/00 (2006.01)
G06N 3/08 (2006.01)
G06T 5/30 (2006.01)

(52) U.S. Cl.
CPC ...... G06T 5/30 (2013.01); *G06T 2207/20081* (2013.01); *G06T 2207/20084* (2013.01)

(58) Field of Classification Search
CPC . G06T 5/50; G06N 20/10; G06N 3/08; G02B 3/0037; H04N 13/128; H04N 13/243
See application file for complete search history.

(56) References Cited

U.S. PATENT DOCUMENTS

| | | | |
|---|---|---|---|
| 7,724,439 B2 | 5/2010 | Li et al. | |
| 7,940,282 B2 | 5/2011 | Milanfar et al. | |
| 8,237,841 B2 | 8/2012 | Tanida et al. | |
| 9,485,397 B2 | 11/2016 | Rudmann et al. | |
| 2015/0030237 A1* | 1/2015 | Jancsary | G06K 9/6282 382/159 |
| 2017/0078568 A1 | 3/2017 | Venkataraman et al. | |
| 2017/0099479 A1 | 4/2017 | Browd et al. | |
| 2017/0111558 A1 | 4/2017 | Brueckner et al. | |
| 2017/0264843 A1 | 9/2017 | Zhou et al. | |
| 2018/0061020 A1 | 3/2018 | Hiasa | |
| 2018/0144447 A1 | 5/2018 | Tate et al. | |
| 2018/0152692 A1 | 5/2018 | Cho et al. | |
| 2018/0376067 A1* | 12/2018 | Martineau | G06T 7/70 |
| 2020/0074186 A1* | 3/2020 | Cao | G06N 3/08 |
| 2020/0321378 A1* | 10/2020 | Paiella | H01L 27/1462 |

FOREIGN PATENT DOCUMENTS

| | | |
|---|---|---|
| KR | 10-1715470 B1 | 3/2017 |
| KR | 10-2019-0060441 A | 6/2019 |
| KR | 10-2019-0116026 A | 10/2019 |
| KR | 10-2020-0038835 A | 4/2020 |
| KR | 10-2020-0067020 A | 6/2020 |

OTHER PUBLICATIONS

Youngjin Yoon et al. "Light-Field Image Super-Resolution Using Convolutional Neural Network" IEEE Signal Processing Letters, vol. 24, No. 6, Jun. 2017, (pp. 848-852) XP011648176.
Nai-Sheng Syu et al. "Learning Deep Convolutional Networks for Demosaicing" arxiv.org, Cornell University Library, Feb. 11, 2018 (14 pages total) XP080856324.
Jiancheng Zou et al. "Microarray Camera Image Super-Resolution with Neural Network and Fusion of V-System" The 13th International Conference on Computer Science & Education, Aug. 8-11, 2018, (pp. 1-6) XP033405391.
Sidong Wu et al. " Artificial compound eye: a survey of the state-of-the-art" Artificial Intelligence Review, vol. 48, No. 4, Sep. 2016, (pp. 573-603) XP036355845.
Fisher Yu et al. "Multi-Scale Context Aggregation by Dilated Convolutions" Retrieved from the Internet: URL:https://arxiv.org/pdf/1511.07122 [retrieved on Apr. 9, 2019], Apr. 30, 2016, (13 pages total) XP55579352.

* cited by examiner

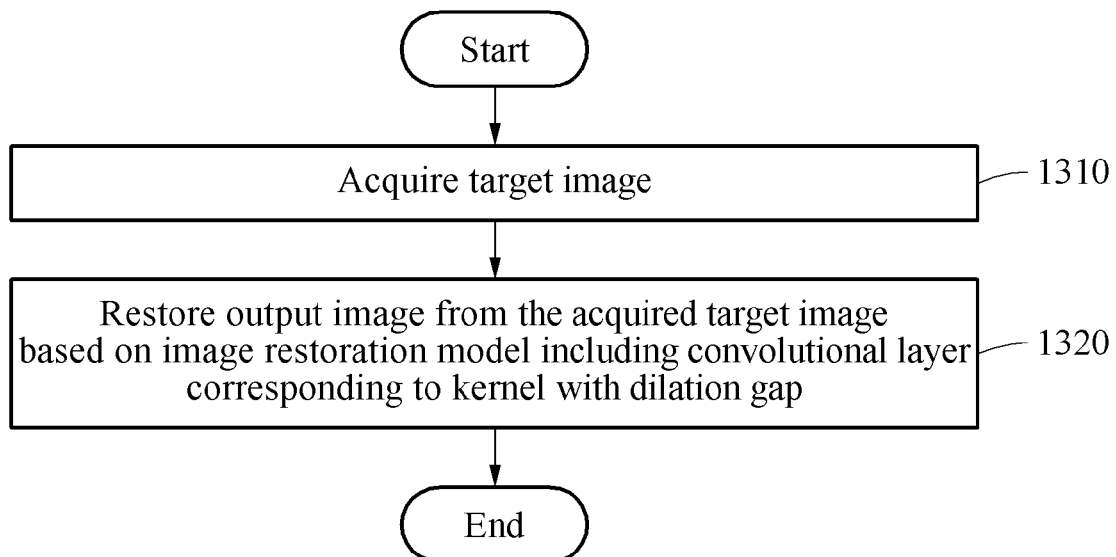
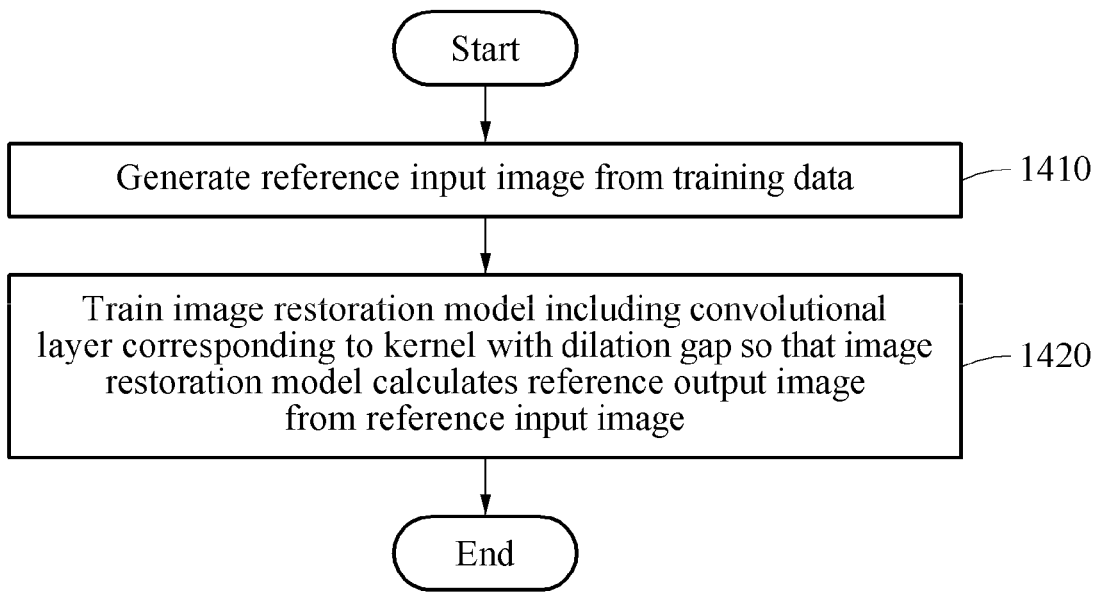

METHOD AND APPARATUS FOR RESTORING IMAGE

CROSS-REFERENCE TO RELATED APPLICATIONS

This application claims priority from U.S. Provisional Application No. 62/730,641, filed on Sep. 13, 2018 in the U.S. Patent and Trademark Office, and Korean Patent Application No. 10-2018-0153829, filed on Dec. 3, 2018 in the Korean Intellectual Property Office, the disclosures of which are incorporated herein by reference in their entireties.

BACKGROUND

1. Field

One or more example embodiments provide methods and apparatuses that relate to technology for restoring an image.

2. Description of the Related Art

Due to development of optical technologies and image processing technologies, capturing apparatuses are being utilized in a wide range of fields, for example, multimedia content, security and recognition. For example, a capturing apparatus may be mounted in a mobile device, a camera, a vehicle or a computer, to capture an image, to recognize an object or to acquire data to control a device. A volume of a capturing apparatus may be determined based on, for example, a size of a lens, a focal length of a lens or a size of a sensor. For example, the volume of the capturing apparatus may be adjusted based on a size of a lens or a size of a sensor. As the size of the sensor decreases, an amount of light incident on the sensor may decrease. Accordingly, a resolution of an image may decrease, or it may be difficult to capture an image in a low illuminance environment. To reduce the volume of the capturing apparatus, a multi-lens including small lenses may be used. When the size of the lens decreases, a focal length of the lens may decrease. Thus, the volume of the capturing apparatus may be reduced based on the multi-lens.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

One or more example embodiments provide a method and apparatus for restring an image.

According to an aspect of an example embodiment, there is provided an image restoration method including acquiring a target image by rearranging an input image of an object, and restoring an output image from the acquired target image based on an image restoration model including a convolutional layer corresponding to a kernel having a dilation gap.

The restoring of the output image may further include restoring the output image based on the convolutional layer corresponding to a plurality of kernels corresponding to a plurality of dilation gaps, respectively, wherein the plurality of dilation gaps may be determined based on a configuration of lenses included in an image sensor and sensing elements included in the image sensor.

The dilation gap may be determined based on a configuration of sensing elements included in an image sensor and a distance between the image sensor and a point of the object spaced apart from the image sensor.

The kernel may be determined based on a position relationship of a plurality of sensing elements included in an image sensor that are configured to receive rays radiated from a point of the object spaced apart from the image sensor by a distance greater than a threshold distance.

The image restoration model may include a convolutional layer corresponding to a kernel determined based on a position relationship of a plurality of sensing elements included in an image sensor that are configured to receive rays radiated from a point spaced apart from the image sensor by a minimum capturing distance.

A kernel corresponding to the minimum capturing distance may have a dilation gap corresponding to a maximum disparity, wherein the maximum disparity may be determined based on the minimum capturing distance of the image sensor, a distance between a central lens of the image sensor and an outermost lens of the image sensor, and a focal length of a lens.

The image restoration model may further include a plurality of convolutional layers corresponding to a plurality of levels, respectively.

The image restoration model may further include a plurality of convolutional layers corresponding to a plurality of kernels having different dilation gaps, respectively.

The restoring of the output image may include extracting feature data from the target image based on the convolutional layer, and generating the output image from feature data based on layers other than the convolutional layer that are included in the image restoration model.

The image restoration model may further include a plurality of convolutional layers corresponding to a plurality of kernels having a same dilation gap.

The restoring of the output image may include restoring the output image from the target image based on the image restoration model that is trained to output a reference output image in response to an input of a reference input image obtained by rearranging a compound eye vision (CEV) image.

The acquiring of the target image may include acquiring a compound eye vision (CEV) image, and generating the target image by rearranging the CEV image.

The acquiring of the CEV image may include acquiring the CEV image based on an intensity of rays received by a plurality of sensing elements through a plurality of lenses provided in an array.

The wherein the plurality of lenses may be arranged eccentrically with respect to the plurality of sensing element.

The generating of the target image may include rearranging the CEV image based on light field (LF) information sensed by the plurality of sensing elements.

The rearranging of the CEV image may include rearranging pixels of the CEV image so that pixels of sensing elements that sense similar LF information among the plurality of sensing elements are adjacent to each other.

The rearranging of the pixels of the CEV image may include determining points of the object that emit an LF sensed by each of the plurality of sensing elements based on a position relationship between the plurality of sensing elements and rays radiated from points of the object that are spaced apart from an image sensor by a distance greater than a threshold distance, and rearranging pixels corresponding to LF information emitted from points that are adjacent to each other so that the rearranged pixels are adjacent to each other.

A non-transitory computer-readable storage medium storing instructions may be configured to be executed by a processor to cause the processor to perform the method.

According to an aspect of another example embodiment, there is provided an image restoration apparatus including an image acquirer configured to acquire a target image, and a processor configured to restore an output image from the acquired target image based on an image restoration model including a convolutional layer corresponding to a kernel having a dilation gap.

According to an aspect of another example embodiment, there is provided an image restoration method including acquiring a plurality of target images by rearranging an input image of a target object corresponding to each distance between an image sensor and the target object, and restoring an output image based on each of the plurality of acquired target images by an image restoration model including convolutional layers.

BRIEF DESCRIPTION OF THE DRAWINGS

The above and/or other aspects will be more apparent by describing example embodiments with reference to the accompanying drawings, in which:

FIG. 13 is a flowchart illustrating an image restoration method according to an example embodiment;

FIG. 14 is a flowchart illustrating a method of training an image restoration model according to an example embodiment;

DETAILED DESCRIPTION

Figure 1:
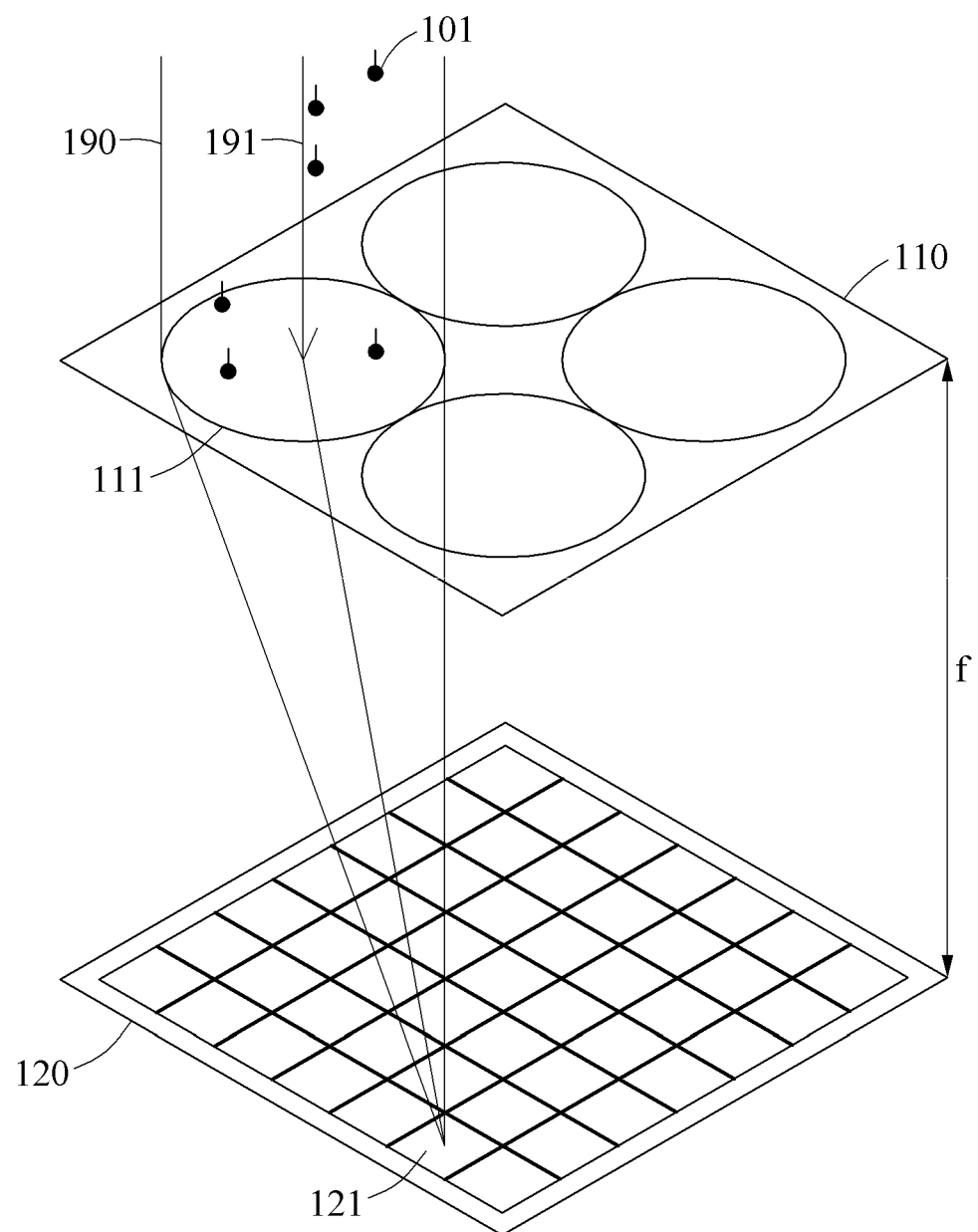
FIG. 1 is a diagram illustrating a structure of an image restoration apparatus according to an example embodiment.

Example embodiments will be described in detail with reference in the accompanying drawings, wherein like reference numerals refer to the like elements throughout.

The following structural or functional descriptions are examples to merely describe the example embodiments, and the scope of the example embodiments are not limited to the descriptions provided in the present specification. Various changes and modifications can be made thereto by those of ordinary skill in the art.

It should be further understood that the terms "comprises," "includes," and "comprising,", and/or "including" when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings.

FIG. 1 is a diagram illustrating a structure of an image restoration apparatus according to an example embodiment.

FIG. 1 illustrates a structure of an image sensor in an image restoration apparatus 100. A quality of an image captured and restored by the image restoration apparatus 100 may be determined based on a number of sensing elements included in a sensor 120 and an amount of light incident on a sensing element. For example, a resolution of the image may be determined based on the number of the sensing elements included in the sensor 120, and a sensitivity of the image, may be determined based on the amount of light incident on the sensing element. The amount of light incident on the sensing element may be determined based on a size of the sensing element. When the size of the sensing element increases, the amount of light incident on the sensing element and a dynamic range of the sensor 120 may increase. Accordingly, a resolution of an image captured by the sensor 120 may increase as the number of the sensing elements included in the sensor 120 increases. Also, the sensor 120 may advantageously operate to capture an image with a high sensitivity even at a low illuminance as a size of a sensing element increases.

A volume of the image restoration apparatus 100 may be determined based on a focal length f of a lens 111. For example, the volume of the image restoration apparatus 100 may be determined based on a gap between the lens 111 and the sensor 120. Because the sensor 120 needs to be located at the focal length f of the lens 111 to collect a light 190 refracted by the lens 111, the sensor 120 and the lens 111 included in the image restoration apparatus 100 may need to be spaced apart from each other by the focal length f of the lens 111. The focal length f of the lens 111 may be determined based on a field of view (FOV) of the image restoration apparatus 100 and a size of the lens 111, for example, a radius of an aperture of the lens 111. For example, when the FOV is fixed, the focal length f may increase in proportion to the size of the lens 111. Also, the size of the lens 111 may be determined based on a size of the sensor 120. For example, to capture an image within a predetermined FOV, the size of the lens 111 may need to increase as the size of the sensor 120 increases.

As described above, to increase a sensitivity of an image while maintaining a FOV and a resolution of the image, the volume of the image restoration apparatus 100 may be increased. For example, to increase a sensitivity of an image while maintaining a resolution of the image, a size of each of sensing elements included in the sensor 120 may need to increase while maintaining a number of the sensing elements. Thus, the size of the sensor 120 may increase. In this example, to maintain the FOV, the size of the lens 111 may increase as the size of the sensor 120 increases, and the focal length f of the lens 111 may increase. Thus, the volume of the image restoration apparatus 100 may increase.

To reduce the volume of the image restoration apparatus 100, design schemes for reducing a size of a sensing element while maintaining the resolution of the sensor 120, or for reducing the resolution of the sensor 120 while maintaining the size of the sensing element may be used. In an example, when the size of the sensing element is reduced while maintaining the resolution of the sensor 120, the size of the sensor 120 and the focal length f of the lens 111 may decrease, which may lead to a decrease in the volume of the image restoration apparatus 100. However, in this example, a sensitivity of the image may also decrease, and a quality of an image under low illuminance may be reduced. In another example, when the resolution of the sensor 120 is reduced while maintaining the size of the sensing element, the size of the sensor 120 and the focal length f of the lens 111 may decrease, which may lead to a decrease in the volume of the image restoration apparatus 100. However, in this example, a resolution of an image may also decrease.

An image quality of a camera of a smartphone is improving, but an image quality of a camera is still generally lower than an image quality of a digital single-lens reflex (DSLR) camera, due to a difference in an amount of light that may be captured by the camera of the smartphone and a DSLR camera. For example, in a structure with an increased size of a sensor to secure the amount of light, a focal length and an aperture size may increase, and thus a form factor of the smartphone may not be satisfied. Hereinafter, the image restoration apparatus 100 for capturing a high resolution image while satisfying a form factor of a smartphone using a lens array 110 will be described.

Referring to FIG. 1, the image restoration apparatus 100 may include a lens array 110 and the sensor 120. The lens array 110 may include lenses, and the sensor 120 may include sensing elements.

When a size of each of the lenses included in the lens array 110 decreases, that is, when a number of lenses included in the same area increases, the focal length f of the lens 111 and the thickness of the image restoration apparatus 100 may decrease. In this example, the image restoration apparatus 100 may restore an original high resolution image by combining low resolution images captured by lenses 111. Thus, a thinner camera may be implemented by dividing and increasing the number of lenses in the lens array 110.

Each of the lenses, for example, the lens 111 included in the lens array 110 may cover a predetermined area of the sensor 120 corresponding to the size of the lens 111. The light 190 passing through the lens 111 may be incident on sensing elements included in the predetermined area of the sensor 120. The light 190 may include a plurality of rays. A ray 191 may correspond to a flow of a photon 101. Each of the sensing elements in the sensor 120 may generate sensing information based on the ray 191 passing through the lenses included in the lens array 110. For example, the sensing element 121 may generate sensing information based on the ray 191 incident through the lens 111. The image restoration apparatus 100 may determine color information, for example, a color value, corresponding to an original color signal associated with points included in a FOV of the image restoration apparatus 100 based on the sensing information output from the sensor 120. Also, the image restoration apparatus 100 may restore a captured image based on the determined color information.

The sensing element 121 may include a color filter to sense an arbitrary color. The sensing element 121 may generate a color value corresponding to a predetermined color as sensing information. Each of the sensing elements included in the sensor 120 may be located to sense a color different from that of a neighboring sensing element that is spatially adjacent to each of the sensing elements.

When a diversity of sensing information is sufficiently secured and when a full rank relationship between the sensing information and original signal information corresponding to the points in the FOV of the image restoration apparatus 100 is formed, a captured image corresponding to a maximum resolution of the sensor 120 may be derived. The diversity of sensing information may be secured based on parameters of the image restoration apparatus 100, for example, a number of lenses included in the lens array 110 or a number of sensing elements included in the sensor 120.

The image restoration apparatus 100 may include a memory configured to store an image restoration model used to restore an image, and a processor configured to restore an image using the image restoration model.

The image restoration apparatus 100 may restore an image more robustly against various noise components included in real conditions of capturing an image that deviate from ideal conditions which include no noise component. For example, an optical aberration, a manufacturing error, and a calibration error between a lens and a sensor may occur in real conditions, and, the depth from camera to the subject may be unknown. Also, the image restoration apparatus 100 may restore an image regardless of, for example, an arbitrary pattern, such as a Bayer pattern. Examples of an operation of restoring a high resolution image based on a plurality of low resolution images captured using multiple lenses by the image restoration apparatus 100 will be described below. The plurality of low resolution images may be in forms of compound eye vision (CEV) images.

Figure 2:
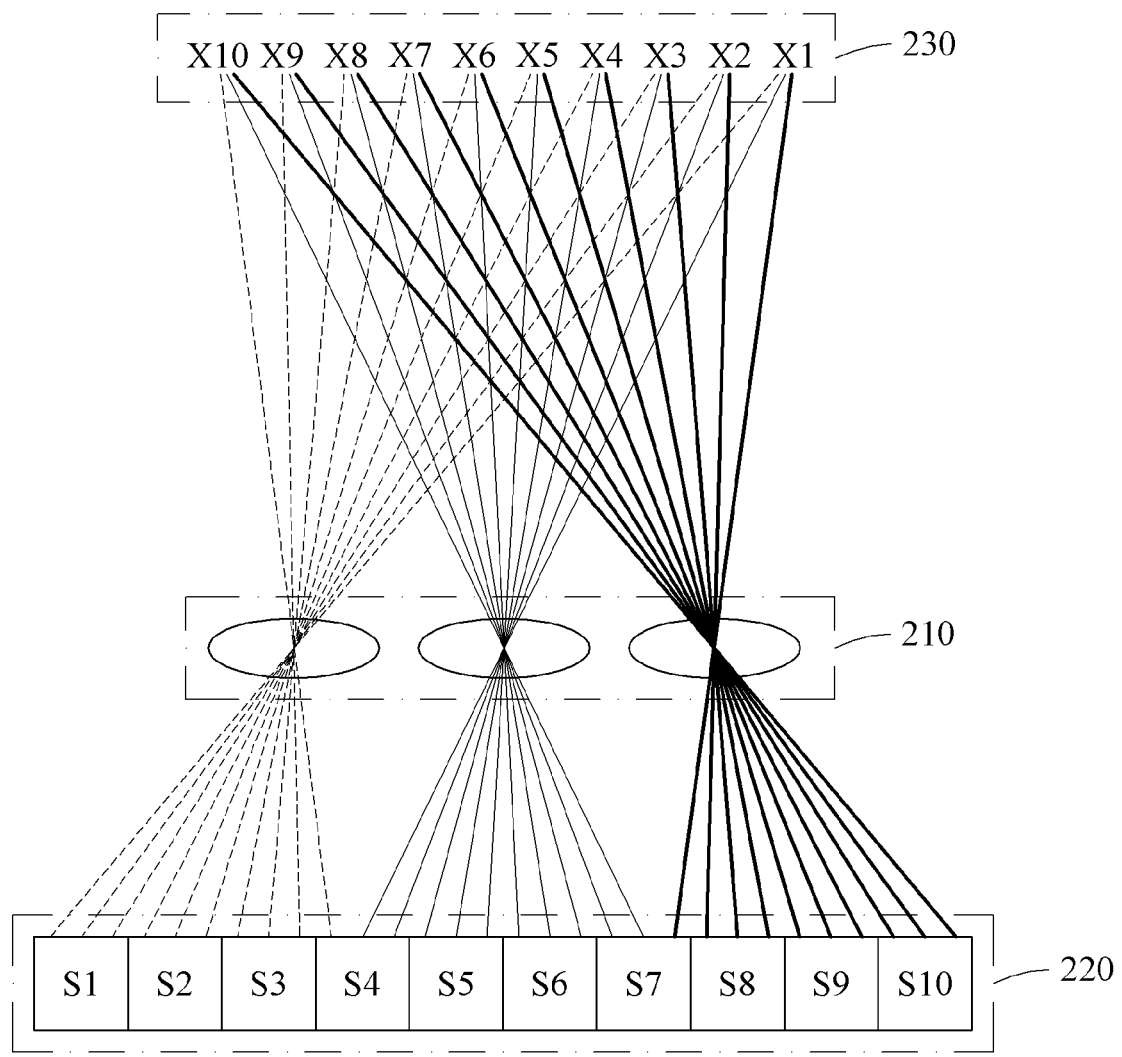
FIG. 2 is a diagram illustrating a sensing element that receives a ray through a lens according to an example embodiment.

FIG. 2 is a diagram illustrating a sensing element that receives a ray through a lens according to an example embodiment.

As described above, a sensor may receive rays corresponding to individual points 230 X1 through X10. The rays may be detected by the sensor through lenses 210. For example, a plurality of rays may be emitted from each of the individual points 230. Rays emitted from the same point may form a light field (LF). An LF emitted from an arbitrary point may be a field that indicates intensities and directions of rays reflected from an arbitrary point on a subject. For example, rays emitted from a first point X1 may form a first LF, and may be incident on a first sensing element S1, a fourth sensing element S4 and a seventh sensing element S7. Rays emitted from each of the other points, that is, points X2 through X10 may also form a corresponding LF. The individual points 230 may be, for example, points on an arbitrary object, such as, a subject. Rays emitted from the individual points 230 may be, for example, rays obtained by reflecting sunlight from an object.

Sensing elements 220, for example, sensing elements S1 through S10 may sense rays that pass through a plurality of lenses that overlap each other. For example, in a lens array of FIG. 2, a focal length between a lens 210 and the sensor may be reduced. Thus, the first sensing element S1 may generate sensing information, for example, an intensity value, of rays that are radiated from the points X1 through X3, and that overlap each other. An image restoration apparatus may restore the overlapping sensing information to restore an image.

The sensing information generated by the sensing elements S1 through S10 may be modeled to be original signal information, for example, an intensity value, corresponding to a ray incident from each of the points 230, as shown in Equation 1 below.

$$S = T \cdot X \quad \text{[Equation 1]}$$

In Equation 1, S denotes a matrix indicating sensing information, for example, a detected intensity value, sensed by each of sensing elements. X denotes a matrix indicating a signal value, for example, a color value of an incident ray, corresponding to a ray incident on the sensing elements S1 through S10 from each point. T denotes a transformation matrix that represents a relationship between sensing information detected by the sensing elements S1 through S10 and signal information corresponding to an incident ray. Rays corresponding to the individual points X1 through X10, the lenses, and the sensing elements S1 through S10 in the structure of FIG. 2 may be modeled as shown in Equation 2 below. In Equation 2, the individual points X1 through X10 may be modeled to be located in an infinite focal point from an image sensor. For example, a distance between the image sensor and each of the individual points X1 through X10 may be greater than a threshold distance.

$$\begin{bmatrix} S1 \\ S2 \\ S3 \\ S4 \\ S5 \\ S6 \\ S7 \\ S8 \\ S9 \\ S10 \end{bmatrix} = \begin{bmatrix} 1 & 1 & 1 & 0 & 0 & 0 & 0 & 0 & 0 & 0 \\ 0 & 0 & 0 & 1 & 1 & 1 & 0 & 0 & 0 & 0 \\ 0 & 0 & 0 & 0 & 0 & 1 & 1 & 1 & 1 & 0 \\ 1 & 1 & 0 & 0 & 0 & 0 & 0 & 0 & 0 & 1 \\ 0 & 0 & 1 & 1 & 1 & 0 & 0 & 0 & 0 & 0 \\ 0 & 0 & 0 & 0 & 0 & 1 & 1 & 1 & 0 & 0 \\ 1 & 0 & 0 & 0 & 0 & 0 & 0 & 0 & 1 & 1 \\ 0 & 1 & 1 & 1 & 0 & 0 & 0 & 0 & 0 & 0 \\ 0 & 0 & 0 & 0 & 1 & 1 & 1 & 0 & 0 & 0 \\ 0 & 0 & 0 & 0 & 0 & 0 & 0 & 1 & 1 & 1 \end{bmatrix} \cdot \begin{bmatrix} X1 \\ X2 \\ X3 \\ X4 \\ X5 \\ X6 \\ X7 \\ X8 \\ X9 \\ X10 \end{bmatrix} \quad \text{[Equation 2]}$$

For convenience of description in Equation 2, X1 through X10 denote signal information, for example, a ray intensity value, of a ray corresponding to each of the individual points X1 through X10. Also, S1 through S10 denote sensing information, for example, a sensing intensity value, detected by the sensing elements S1 through S10. For example, a relationship, for example, the above-described transformation matrix, between the sensing information, for example, color information, corresponding to the sensing elements S1 through S10 configuring a sensor and an original signal corresponding to rays incident from the individual points X1 through X10 may be determined based on an arrangement of the lenses 210 and the sensor, a number of lenses included in the lens array, or a number of sensing elements S1 through S10 configuring the sensor.

Hereinafter, an operation of rearranging a pixel corresponding to a sensing element based on the above-described modeling will be described with reference to FIG. 3.

Figure 3:
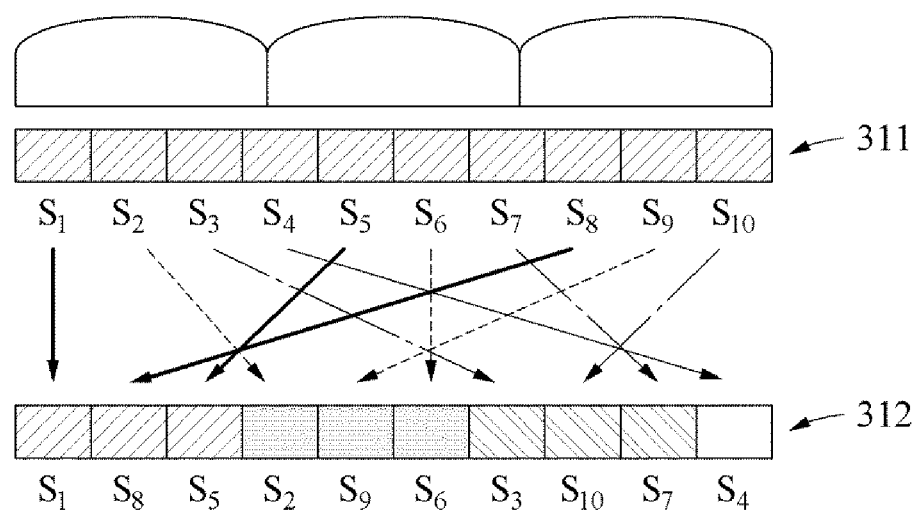
FIG. 3 is a diagram illustrating a rearrangement of a pixel corresponding to a sensing element according to an example embodiment.

FIG. 3 is a diagram illustrating a rearrangement of a pixel corresponding to a sensing element according to an example embodiment.

A plurality of lenses and a plurality of sensing elements 311 may be arranged eccentrically, and may not be in a one-to-one relationship, with respect to each other. For example, the lenses may cover a non-integer number of sensing elements 311, instead of covering an integer number of sensing elements 311. In an example, a multi-lens array structure may be implemented as a fractional alignment structure. As shown in FIG. 3, the lenses may have different optical center axes (OCAs). Parameters of the multi-lens array structure may include, for example, a number of sensing elements P and a number of lenses L. A ratio P/L between the number P of sensing elements and the number L of lenses may be a real number. Each of the lenses may cover the same number of sensing elements as a pixel offset corresponding to P/L. In FIG. 3, each of the lenses covers "3.33" sensing elements. Since OCAs of the lenses are slightly different from each other, the lenses may receive different LF information. Since a direction of a chief ray of each of the lenses is also changed, an image sensor may optically acquire a larger amount of sensing information based on each of the sensing elements sensing different combinations of LF information. Thus, an image restoration apparatus may restore an image with a higher resolution based on a variety of sensing information acquired as described above.

FIG. 3 is a cross-sectional view of a geometric structure between the lenses and the sensing elements 311. A first lens may cover all of a first sensing element S1 through a third sensing element S3, and a portion of a fourth sensing element S4 (for example, a portion corresponding to ⅓). A second lens may cover both a fifth sensing element S5 and a sixth sensing element S6, together with another portion of the fourth sensing element S4 and a portion of a seventh sensing element S7. A third lens may cover an eighth sensing element S8 through a tenth sensing element S10, and another portion of the seventh sensing element S7.

Based on the above-described geometric structure of the lenses and the sensing elements 311, sensing elements 311 covered by one lens may sense LF information that is different from LF information sensed by a sensing element covered by another lens. LF information may refer to information about a combination of a plurality of LFs. For example, the first sensing element S1 covered by the first lens may sense an LF corresponding to a first point X1 through a third point X3. Also, the fifth sensing element S5 covered by the second lens may sense an LF corresponding to the third point X3 through a fifth point X5.

The image restoration apparatus may rearrange positions of pixels of an input image based on a correlation between LF information. For example, the image restoration apparatus may rearrange pixels of an input image, for example, a CEV image, so that pixels of sensing elements 311 that sense similar LF information among the plurality of sensing elements 311 are adjacent to each other.

For example, the image restoration apparatus may rearrange pixels indicating an intensity value of a signal sensed by an individual sensing element, based on a similarity between LF information sensed by the sensing element and LF information sensed by another sensing element, as shown in FIG. 3. For example, when a number of same LFs included in LF information sensed by two sensing elements 311 increases, a similarity between the LF information may increase.

When points of a subject reflecting rays are assumed to be arranged at an infinite focal point from an image sensor, the image restoration apparatus may determine LF information that may be sensed by each of the sensing elements. For example, the image restoration apparatus may determine points that emit an LF sensed by each of the plurality of sensing elements 311 based on a position relationship between the plurality of sensing elements 311 and rays radiated from points spaced apart from the image sensor by a distance greater than a threshold distance. The image restoration apparatus may rearrange pixels corresponding to an LF emitted from points that are spatially adjacent to each other so that the pixels are adjacent to each other.

The individual points X1 through X10 of FIG. 2 are adjacent to each other in an order shown in FIG. 2. For example, the first point X1 may be adjacent to the second point X2, and the second point X2 may be adjacent to the first point X1 and the third point X3. Two adjacent points may be, for example, points that are spatially adjacent to each other in a subject.

Both LF information sensed by the first sensing element S1 and LF information sensed by the eighth sensing element S8 may include an LF corresponding to the second point X2 and the third point X3. Thus, the first sensing element S1 and the eighth sensing element S8 may sense similar LF information. When pixels corresponding to similar LF information are rearranged to be adjacent to each other, Equation 2 may be represented as shown in Equation 3 below.

$$\begin{bmatrix} S1 \\ S8 \\ S5 \\ S2 \\ S9 \\ S6 \\ S3 \\ S10 \\ S7 \\ S4 \end{bmatrix} = \begin{bmatrix} 1 & 1 & 1 & 0 & 0 & 0 & 0 & 0 & 0 & 0 \\ 0 & 1 & 1 & 1 & 0 & 0 & 0 & 0 & 0 & 0 \\ 0 & 0 & 1 & 1 & 1 & 0 & 0 & 0 & 0 & 0 \\ 0 & 0 & 0 & 1 & 1 & 1 & 0 & 0 & 0 & 0 \\ 0 & 0 & 0 & 0 & 1 & 1 & 1 & 0 & 0 & 0 \\ 0 & 0 & 0 & 0 & 0 & 1 & 1 & 1 & 0 & 0 \\ 0 & 0 & 0 & 0 & 0 & 0 & 1 & 1 & 1 & 0 \\ 0 & 0 & 0 & 0 & 0 & 0 & 0 & 1 & 1 & 1 \\ 1 & 0 & 0 & 0 & 0 & 0 & 0 & 0 & 1 & 1 \\ 1 & 1 & 0 & 0 & 0 & 0 & 0 & 0 & 0 & 1 \end{bmatrix} \cdot \begin{bmatrix} X1 \\ X2 \\ X3 \\ X4 \\ X5 \\ X6 \\ X7 \\ X8 \\ X9 \\ X10 \end{bmatrix}$$

[Equation 3]

Referring to FIG. 3, sensing elements 312 are rearranged based on Equation 3. In FIG. 3, the first sensing element S1 may be covered by the first lens, the eighth sensing element S8 may be covered by the third lens, and the fifth sensing element S5 may be covered by the second lens. Thus, the image restoration apparatus may rearrange pixels so that sensing information corresponding to rays passing through different lenses may be adjacent to each other.

An image obtained by a rearrangement is described below with reference to FIG. 4.

Figure 4:
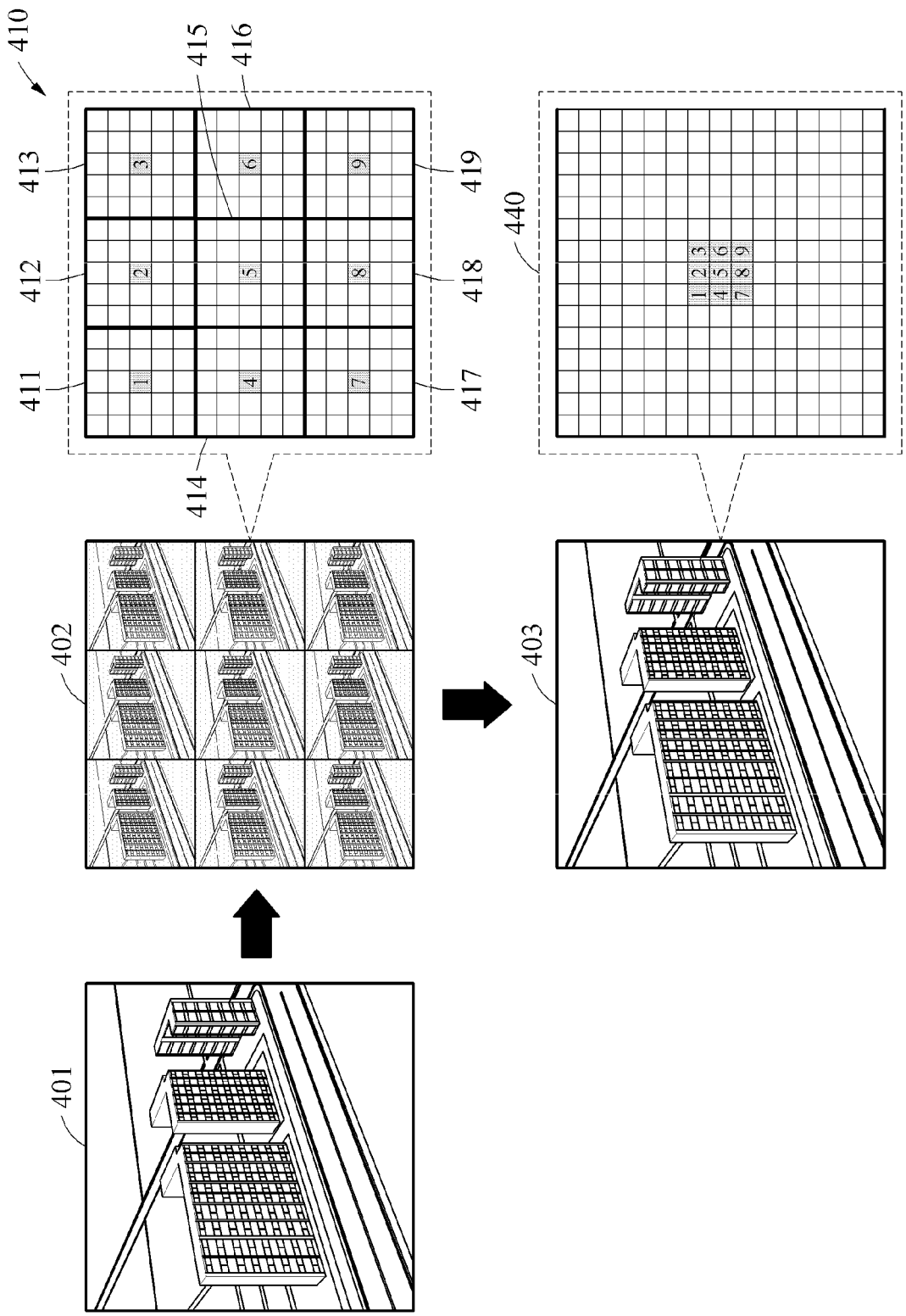
FIG. 4 illustrates a process of generating a target image by rearranging a compound eye vision (CEV) image according to an example embodiment.

FIG. 4 illustrates a process of generating a target image by rearranging a CEV image according to an example embodiment.

An image restoration apparatus may capture an original scene 401 using a plurality of lenses and a plurality of sensing elements 410 having the above-described structure. The image restoration apparatus may acquire a CEV image 402 by sensing rays passing through a plurality of lenses. The CEV image 402 may refer to an image acquired by overlappingly capturing the scene 401, as observed through compound eyes of an insect. For example, the image restoration apparatus may acquire the CEV image 402 based on intensities of rays received from the sensing elements 410 through the lenses arranged in an array.

For example, in an image sensor of FIG. 4, the sensing elements 410 may be classified based on regions covered by the plurality of lenses. FIG. 4 illustrates a total of nine regions, that is, a region 411 corresponding to a first lens through a region 419 corresponding to a ninth lens. Although each of the regions 411 through 419 includes an integer number of sensing elements 410, embodiments are not limited thereto. For example, each of the regions 411 through 419 may also include a non-integer number of sensing elements 410.

Also, in FIG. 4, a ray reflected from an arbitrary point of the scene 401 may reach a first pixel through a ninth pixel in the image sensor. In FIG. 4, images included in the CEV image 402 may respectively correspond to the plurality of lenses.

The image restoration apparatus may rearrange the CEV image 402 based on LF information sensed by the plurality of sensing elements 410. The image restoration apparatus may generate a target image 403 by rearranging the CEV image 402. For example, the image restoration apparatus may gather pixels of sensing elements 410 determined to sense similar LF information as described above in Equation 3.

For example, as shown in FIG. 4, the first pixel through the ninth pixel may be adjacent to each other among rearranged pixels 440. The above rearrangement of pixels may be represented as shown in Equation 4 below.

$$S=(P \cdot T) \cdot X$$ [Equation 4]

In Equation 4, S denotes a matrix indicating sensing information sensed by an individual sensing element. X denotes a matrix indicating a signal value corresponding to a ray incident on sensing elements 410. T denotes a transformation matrix and may represent a relationship between sensing information sensed by sensing elements 410 and signal information corresponding to incident light. P denotes a rearrangement matrix to rearrange pixels corresponding to similar LF information to be adjacent to each other based on a distance, for example, a distance greater than a threshold, between the image sensor and an object.

The image restoration apparatus may use an inverse matrix of a matrix P·T to restore the original scene 401 based on Equation 4. For a presence of the inverse matrix of the matrix P·T, the matrix P·T may need to have a full rank. Thus, parameters of a capturing device may be adjusted so that the matrix P·T may have a full rank. Since the inverse matrix of the matrix P·T is present, a matrix X indicating original signal information may be calculated from a product of the inverse matrix of the matrix P·T and a matrix S indicating sensing information sensed by a sensing element, using Equation 5 shown below.

$$X=(P \cdot T)^{-1} \cdot (S+N)$$

In Equation 5, N denotes noise that may occur in sensing of LF information.

The image restoration apparatus may generate the target image 403 by rearranging the CEV image 402 acquired by capturing the scene 401. For example, when the scene 401 includes only an object located at a relatively long distance from the image sensor, pixels corresponding to rays reflected from the object may be rearranged to be adjacent to each other as shown in FIG. 4. Thus, the image restoration apparatus may acquire a high resolution image.

However, in this example, the object is assumed to be spaced apart from the image sensor by an infinite focal length, for example, greater than a threshold distance. Hereinafter, an image restoration operation with respect to a relatively close distance is described.

Figure 5:
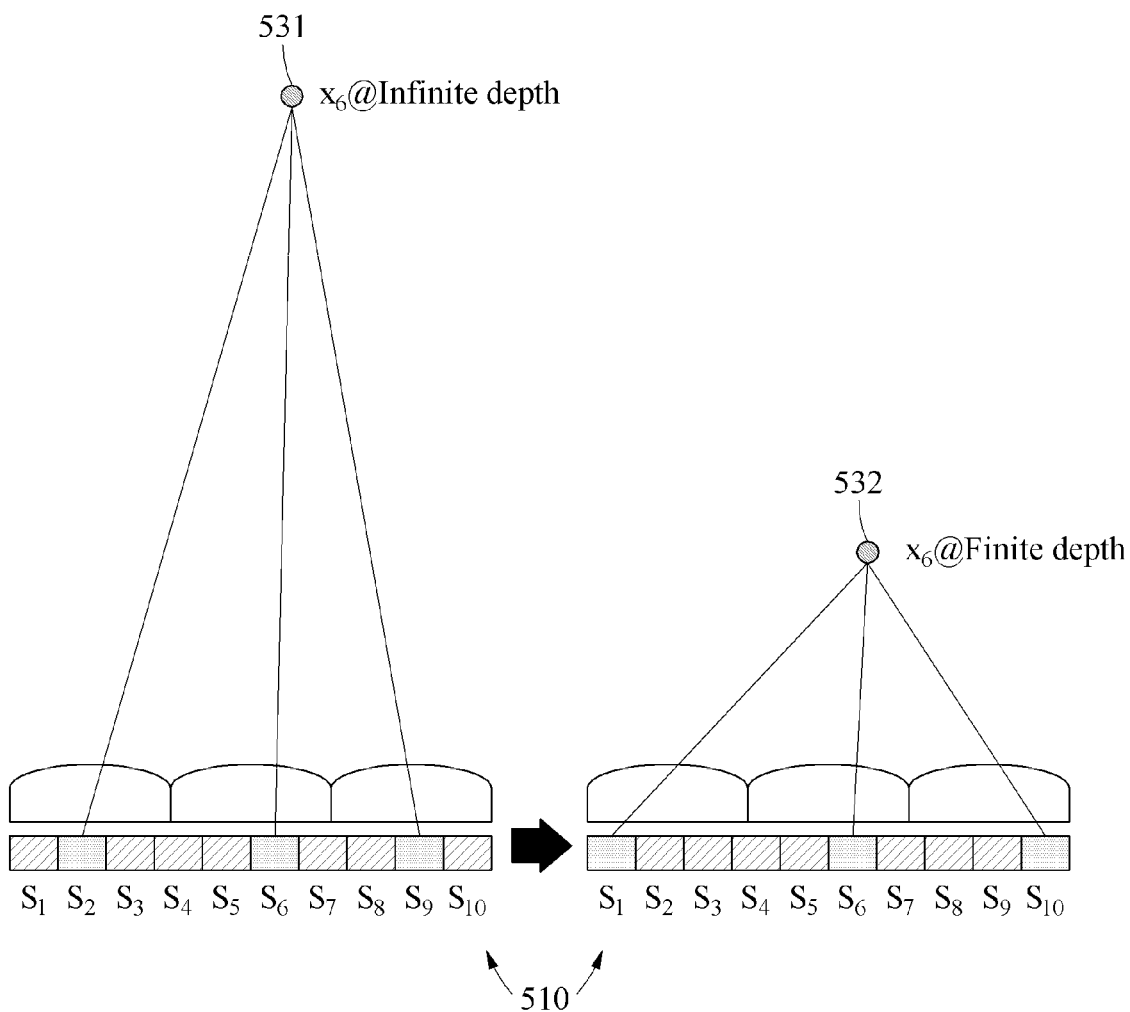
FIGS. 5 and 6 illustrate a change in a sensing element that receives a ray based on a distance to an object according to an example embodiment.
Figure 6:
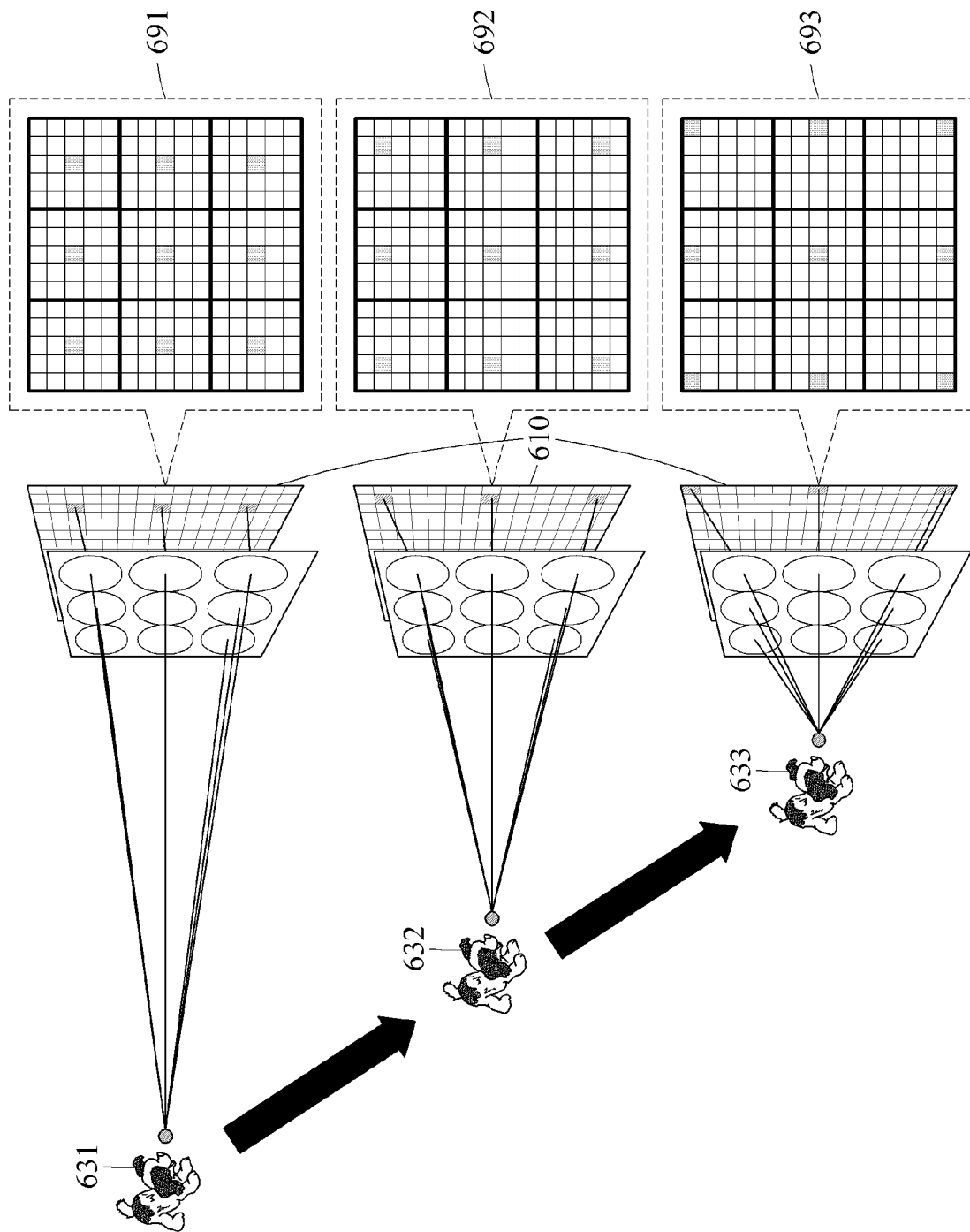

FIGS. 5 and 6 illustrate a change in a sensing element that receives a ray based on a distance to an object according to an example embodiment.

When a position of a subject with respect to an image sensor changes, a sensing element that senses arbitrary LF information may also change.

In an example, as shown in FIG. 5, when a subject 531 is at a sixth point X6 that is an infinite focal point, an LF corresponding to the sixth point X6 may be sensed by a second sensing element S2, a sixth sensing element S6 and a ninth sensing element S9. In another example, when a subject 532 is at a finite depth in a direction of the sixth point X6, the LF corresponding to the sixth point X6 may be sensed by a first sensing element S1, the sixth sensing element S6 and a tenth sensing element S10. Thus, a position of a sensing element that senses an LF corresponding to a point in the same direction among sensing elements 510 may change based on a distance between an image sensor and a point of a subject.

FIG. 6 illustrates first sensing elements 691 that sense an LF corresponding to an arbitrary point of a subject 631 in an image sensor 610 when the subject 631 is at an infinite focal point in a 3×3 lens array structure. When a subject 632 is at an intermediate distance between the infinite focal point and the image sensor 610, the image sensor 610 may sense an LF corresponding to an arbitrary point using second sensing elements 692. When a subject 633 is located closer to the image sensor 610 than the intermediate distance, the image sensor 610 may sense an LF corresponding to an arbitrary point of the subject 633 using third sensing elements 693.

Thus, an image restoration apparatus may restore an output image from a target image obtained by rearranging pixels with a high correlation between LF information at the infinite focal point to be adjacent to each other, using a machine learning structure that is based on a depth with a subject. The restored output image may be, for example, a high resolution image.

Figure 7:
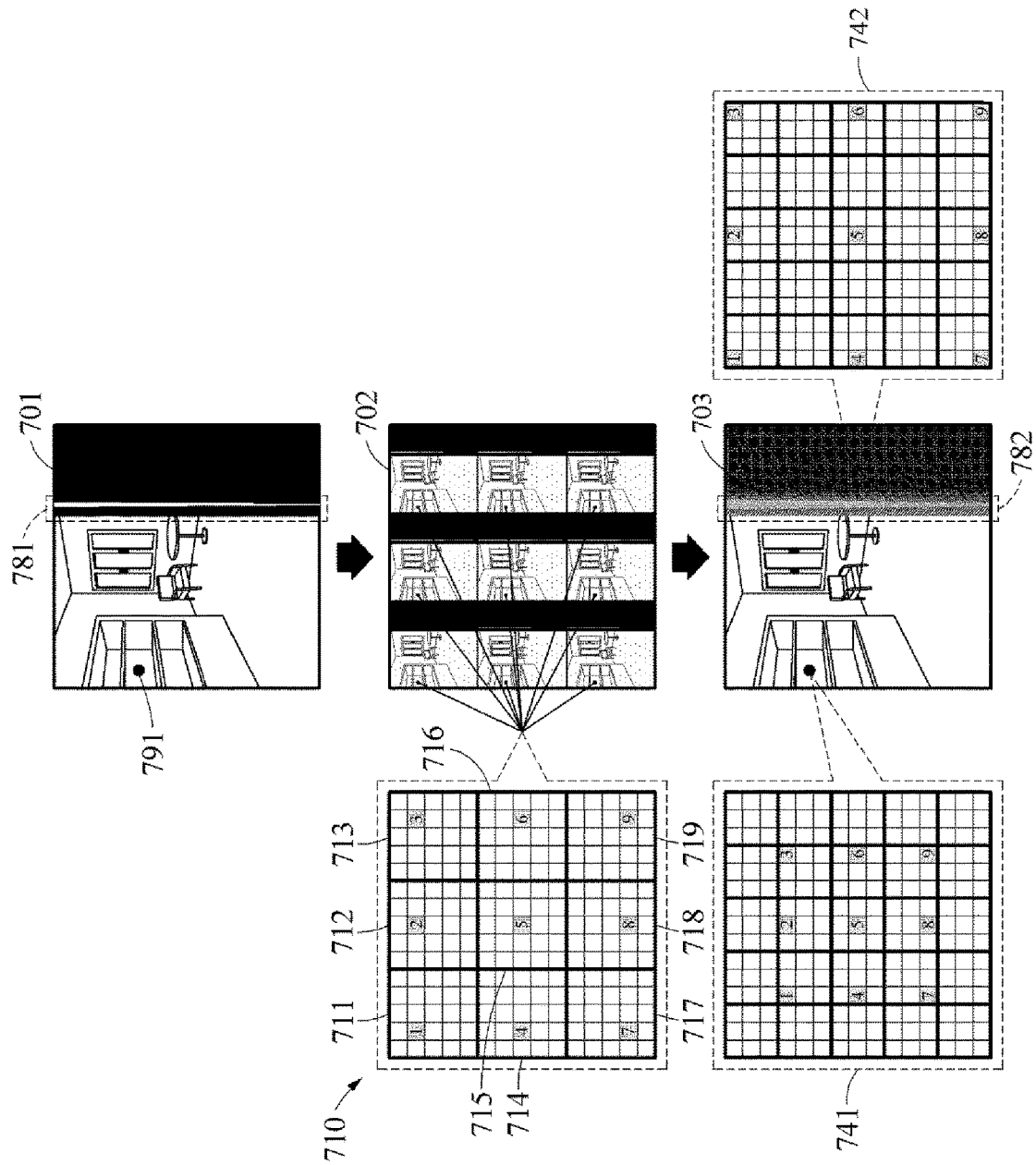
FIG. 7 illustrates a decrease in a resolution for a nearby object in a rearrangement of a CEV image according to an example embodiment.

FIG. 7 illustrates a decrease in a resolution for a nearby object in a rearrangement of a CEV image according to an example embodiment.

An image restoration apparatus may generate a CEV image 702 by capturing a scene 701. For example, the scene 701 may include a detail portion 781 located very close, for example, less than a minimum distance for restoring an image of a subject, to an image sensor. The minimum distance may be determined based the size and number of the lenses, the distance between the lenses and the sensor elements, and the size and number of the sensor elements. For example, the minimum distance may be based on a distance between a central lens of the image sensor and an outermost lens of the image sensor. Also, the scene 701 may include a target portion 791 at an intermediate distance between an infinite focal point and the image sensor.

In the CEV image 702 sensed by sensing elements 710, a ray reflected from a point corresponding to the target portion 791 of the scene 701 may correspond to a pixel #1 in a first region 711. Similarly, a ray reflected from a point corresponding to the target portion 791 may correspond to a pixel #2 in a second region 712, a pixel #3 in a third region 713, a pixel #4 in a fourth region 714, a pixel #5 in a fifth region 715, a pixel #6 in a sixth region 716, a pixel #7 in a seventh region 717, a pixel #8 in an eighth region 718 and a pixel #9 in a ninth region 719. In FIG. 7, a portion of an LF corresponding to the target portion 791 may be sensed by a sensing element adjacent to a central sensing element covered by each lens, instead of being sensed by the central sensing element, unlike FIG. 4.

The image restoration apparatus may rearrange pixels of the CEV image 702 that is similar to those described above with reference to FIGS. 3 and 4. However, pixels #1 through #9 corresponding to an LF generated by the target portion 791 among pixels 741 of the target portion 791 may be rearranged not to be adjacent to each other, because the target portion 791 is in an intermediate position as shown in FIG. 7 although the object is assumed to be at the infinite focal point in FIGS. 3 and 4. Thus, a target image 703 obtained by rearranging the CEV image 702 may appear to be blurred in comparison to the original scene.

Also, a portion 782 of the target image 703 that is close to the image sensor and that is restored from the detail portion 781 of the scene 701 may be restored to be further blurred, because pixels 742 of the detail portion 781 are rearranged to be farther away from each other than pixels 741 rearranged for the target portion 791 because a physical distance from camera to the detail portion 781 is shorter than a physical distance from the camera to the target portion 791 with intermediate position.

Thus, due to the above change in a sensing position of an LF based on a distance, the image restoration apparatus may restore the CEV image 702 to a high resolution image based on a convolutional neural network (CNN) using kernels with various dilation gaps.

A restoration of the target image 703 using the CNN is described below.

Figure 8:
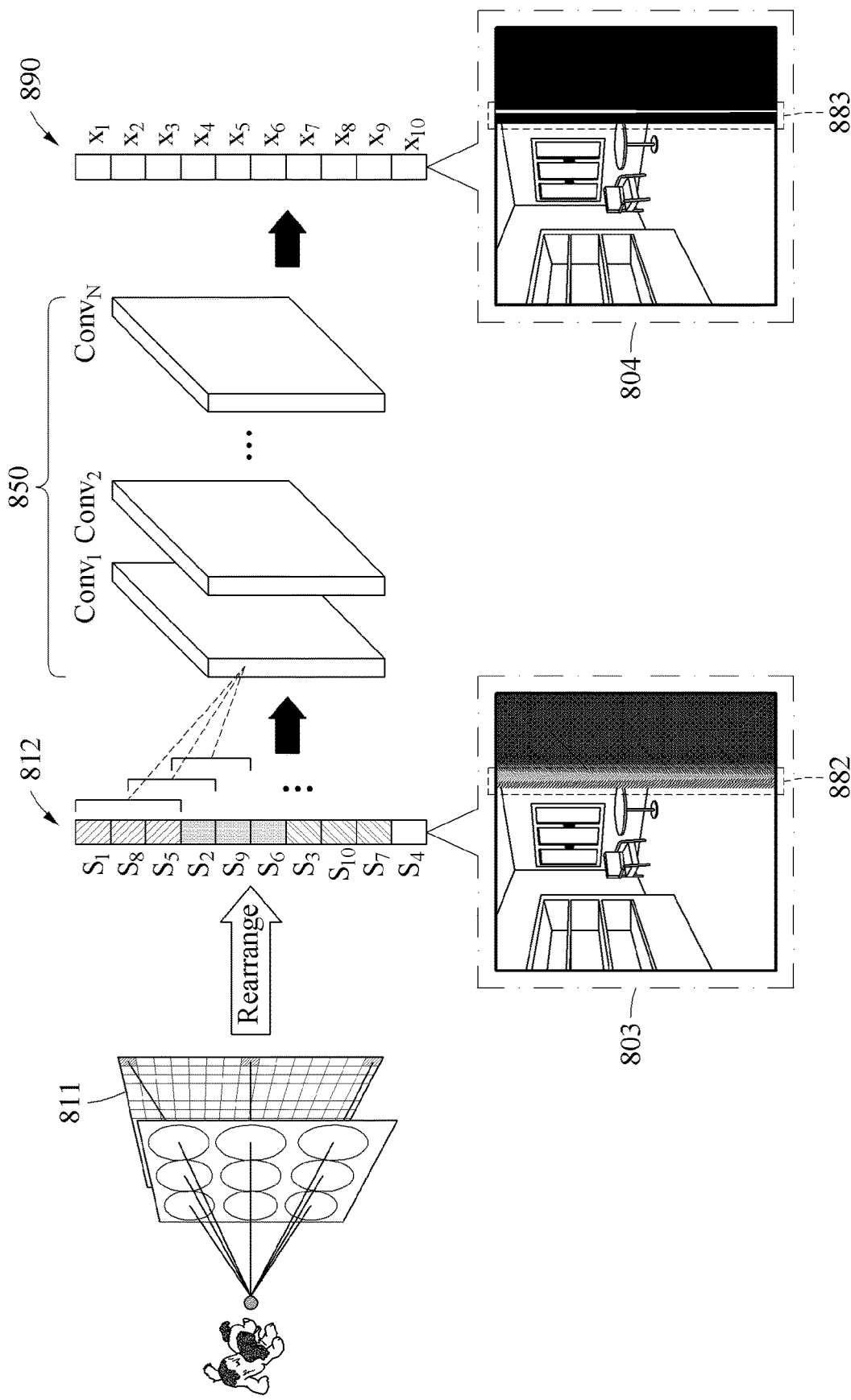
FIG. 8 is a diagram illustrating a process of restoring an output image from a target image according to an example embodiment.

FIG. 8 is a diagram illustrating a process of restoring an output image from a target image according to an example embodiment.

An image restoration apparatus may rearrange a CEV image sensed by sensing elements 811 in an input layer 812 and may generate a target image 803. The image restoration apparatus may input pixels of the target image 803 to an image restoration model 850.

The image restoration apparatus may calculate an output image 804 from the generated target image 803 based on the image restoration model 850. For example, the image restoration model 850 may be a model trained to output a reference output image in response to an input of a reference input image obtained by rearranging a reference CEV image. The image restoration model 850 may include an input layer, a plurality of hidden layers, and an output layer. The image restoration model 850 may include, for example, a CNN as a machine learning structure, and a hidden layer may include a convolutional layer. The CNN may refer to a neural network including a convolutional layer. For example, the image restoration model 850 may include a convolutional layer corresponding to a kernel with various dilation gaps. The kernel may have a size of n×n, in which n may be an integer greater than or equal to 1. In the following description, n is 3. Examples of a kernel with different dilation gaps will be further described below with reference to FIGS. 9A through 9C.

For example, the image restoration apparatus may calculate the output image 804 based on a convolutional layer having a kernel corresponding to each of a plurality of dilation gaps determined based on an arrangement structure of lenses and sensing elements within an image sensor. For example, each of the dilation gaps may correspond to each of the disparities caused between the lenses. A convolution operation of the target image 803 using a kernel of n×n may be repeated using a convolutional layer having a kernel corresponding to each of various dilation gaps, to extract feature data, for example, an image feature. The image restoration apparatus may extract a more abstract feature using a convolutional layer corresponding to a plurality of levels. For example, the image restoration apparatus may include convolutional layers, for example, $Conv_1$ through $Conv_N$, corresponding to N levels. In this example, N may be an integer greater than or equal to 1. Also, each of the convolutional layers may generate a hidden output corresponding to a plurality of kernels with various dilation gaps.

The image restoration apparatus may propagate input data corresponding to the target image 803 from a lower level, for example, a level close to an input layer, of convolutional layers corresponding to a plurality of levels to an upper level, for example, a level close to an output layer, to extract feature data obtained by abstracting the target image 803. Also, the image restoration apparatus may calculate the output image 804 that is finally restored form the extracted feature data. Pixels 890 of the output image 804 may have pixel values restored with a high resolution that is similar to an actual scene.

The image restoration apparatus may generate the output image 804 with a high resolution using a convolutional layer corresponding to a kernel with various dilation gaps, even though an accurate depth to an object in a scene is not estimated. A kernel may have a dilation gap designed based on a distribution of rays incident on an image sensor based on a distance between an object and the image sensor. The image restoration apparatus may focus on pixels with similar LF information using the kernel while extracting a feature of an image using the convolutional layer. Although the target image 803 includes an object 882 that seems to be blurred as shown in FIG. 8, the image restoration apparatus may calculate the output image 804 including a clear object 883 from the target image 803 based on the image restoration model 850.

Because the target image 803 is an image including pixels with a high correlation between LFs, the image restoration model 850 may be used to calculate the output image 804 with a higher resolution from the target image 803. For example, rearranging a CEV image and training a neural network on the rearranged CEV image may be more advantageous than directly training the neural network on a CEV image, because when a CEV image is input to the neural network, a resolution of an image of which an image signal with a low correlation with a position of a pixel that needs to be restored is restored based on the neural network may decrease.

The neural network may be an example of a deep neural network (DNN). The DNN may include, for example, a fully connected network, a deep convolutional network, and a recurrent neural network. The neural network may be used to restore an image by mapping input data and output data that are in a nonlinear relationship based on deep learning. The deep learning may be a machine learning technique to solve a problem, such as image restoration from a big data set. Through supervised or unsupervised learning of the deep learning, input data and output data may be mapped to each other.

The neural network may include an input layer, a hidden layer and an output layer. Each of the input layer, the hidden layer and the output layer may include a plurality of nodes. In FIG. 8, a hidden layer is illustrated as a convolutional layer.

Referring to FIG. 8, the image restoration model 850 may include N hidden layers. N may be an integer greater than or equal to 1. Also, the neural network may include a separate input layer to receive input data, however, embodiments are not limited thereto. Accordingly, input data may be input directly to a hidden layer. In the neural network, nodes of layers other than the output layer may be connected to nodes of a next layer via links to transmit output signals. A number of links may correspond to a number of nodes included in the next layer.

To each of nodes included in a hidden layer, an output of an activation function associated with weighted inputs of nodes included in a previous layer may be input. The weighted inputs may be obtained by multiplying a weight to inputs of the nodes included in the previous layer. The weight may be referred to as a parameter of the neural network. For example, the weight may correspond to a kernel element included in a kernel matrix in a convolutional layer. The activation function may include, for example, a sigmoid function, a hyperbolic tangent (tanh) function, or a rectified linear unit (ReLU) function. A nonlinearity may be formed in the neural network by the activation function. To each of nodes included in the output layer, weighted inputs of nodes included in a previous layer may be input.

When a width and a depth of the neural network are sufficiently large, the neural network may have a capacity large enough to implement an arbitrary function. When the neural network is trained on a sufficiently large quantity of training data through an appropriate training process, an optimal recognition performance may be achieved.

Hereinafter, a kernel corresponding to each convolutional layer and having various dilation gaps will be described with reference to FIGS. 9A through 9C.

Figure 9A:
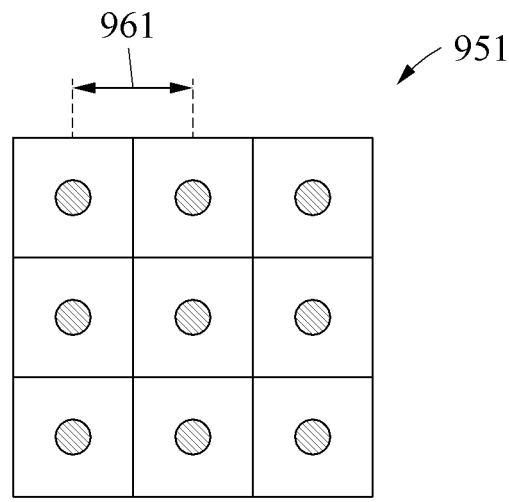
FIGS. 9A, 9B, and 9C are diagrams illustrating a kernel with a dilation gap used in a convolutional layer according to an example embodiment.
Figure 9B:
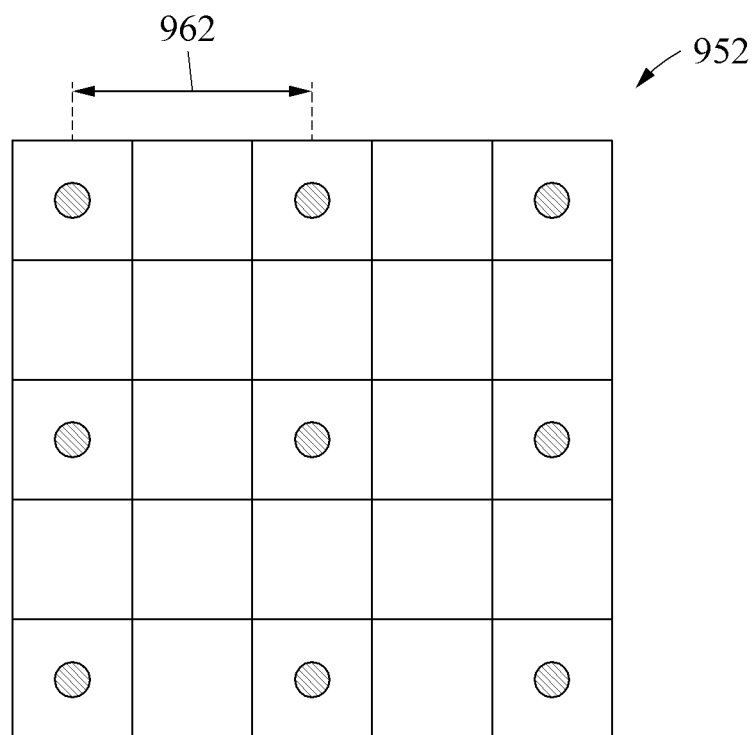
Figure 9C:
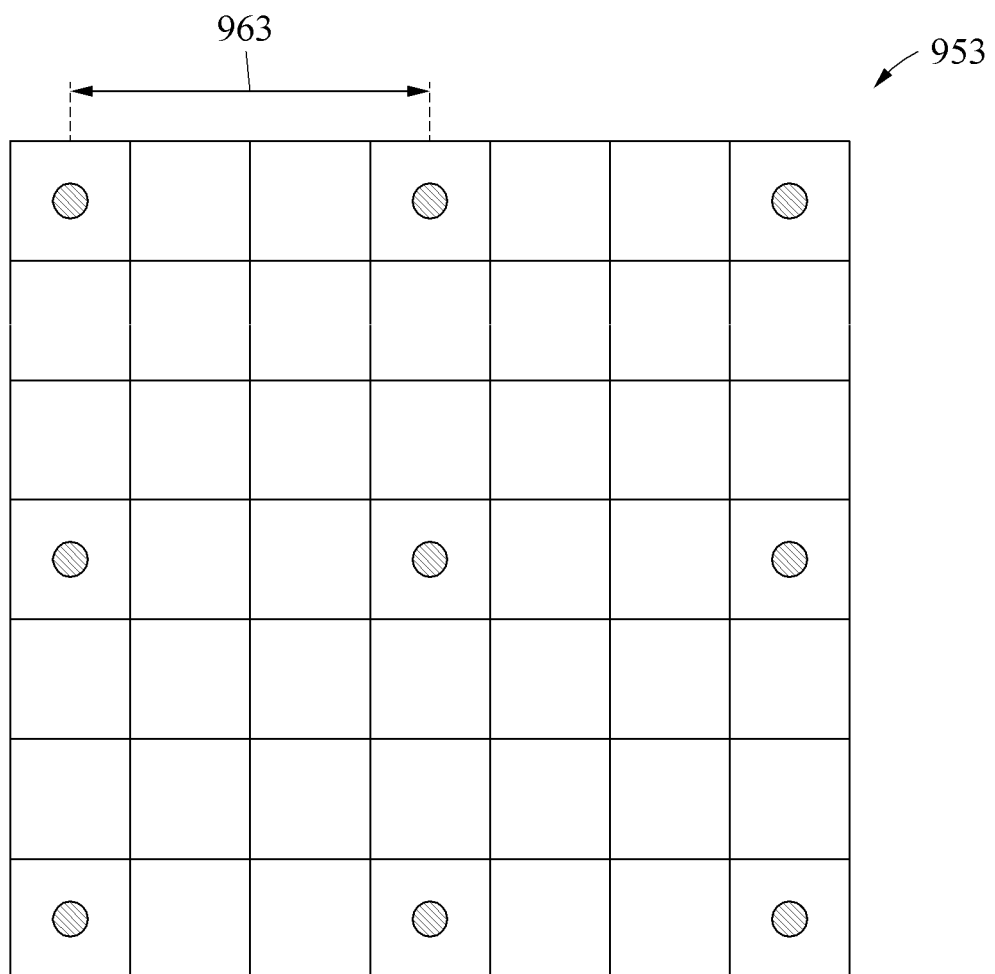

FIGS. 9A through 9C are diagrams illustrating a kernel with a dilation gap used in a convolutional layer according to an example embodiment.

A kernel may be a parameter of a CNN and may be defined as, for example, a matrix. The kernel may be referred to as a convolution matrix or a filter. The kernel may be a square matrix, and may be defined as, for example, an n×n matrix, in which n may be an integer greater than or equal to 1. When the kernel is defined as a matrix (hereinafter, referred to as a kernel matrix), the kernel matrix may include a plurality of elements. When n is an odd number, an element, for example, an element of (1, 1), in a first column of a first row, an element, for example, an element of (1, (n+1)/2), in a middle column of the first row, an element, for example, an element of (1, n), in a last column of the first row, an element, for example, an element of ((n+1)/2, 1), in a first column of a middle row, a central element, for example, an element of ((n+1)/2, (n+1)/2), an element, for example, an element of ((n+1)/2, n), in a last column of the middle row, an element, for example, an element of (n, 1), in a first column of a last row, an element, for example, an element of (n, (n+1)/2), in a middle column of the last row, and an element, for example, an element of (n, n), in a last column of the last row within the kernel matrix may each have an arbitrary weight, for example, a non-zero value, that is trained by machine learning. Also, the other elements may have a value of zero, however, example embodiments are not thereto. According to an example embodiment, an element with a non-zero value in the kernel matrix may be referred to as a kernel element. In FIGS. 9A through 9C, a kernel element is represented as a dot, and the other elements having a value of zero are represented as blanks.

A convolutional layer of a neural network may have one or more kernels. A processor may perform a convolution operation using a kernel of the convolutional layer. For example, the processor may calculate a matrix product between kernel elements at a pixel position in which the kernel strides and values of input data corresponding to the kernel elements during striding of the kernel with respect to the input data. The processor may calculate a matrix product between kernel elements for an arbitrary pixel position and values of input data corresponding to the kernel elements, to output a feature value for the pixel position.

The processor may extract a feature map from input data for each individual kernel. For example, when a convolutional layer includes "m" kernels, the processor may extract "m" feature maps from input data based on the convolutional layer. In this example, m may be an integer greater than or equal to 1.

Elements included in a kernel matrix may be a kind of weights, and may be a target to be trained. For example, elements of a kernel may be updated to minimize a loss of a neural network based on training of the image restoration model, for example, by back propagation. However, embodiments are not limited thereto.

A size of a kernel may be determined based on a number of columns and a number of rows in a kernel matrix. For example, when a kernel is formed as an n×n matrix that is a square matrix, a size of the kernel may be n×n. According to an example embodiment, n is 3, and a total of nine elements are included in the kernel matrix.

An image restoration model may include convolutional layers corresponding to kernels with various dilation gaps. FIGS. 9A through 9C illustrate examples of a kernel with a dilation gap.

According to an example embodiment, a dilation gap may refer to a gap between elements with different kernel weights within the same row or the same column.

The image restoration model may include a convolutional layer corresponding to a kernel determined based on a position relationship between sensing elements that receive rays radiated from a point spaced apart from an image sensor by a distance greater than a threshold distance. For example, a kernel 951 of FIG. 9A may be optimized when a subject is assumed to be at an infinite distance from the image sensor, and may be referred to as a default kernel. A dilation gap 961 between kernel weights of the kernel 951 may have a default value, for example, 1.

FIG. 9B illustrates a kernel 952 with a dilation gap 962 having a value of 2. FIG. 9C illustrates a kernel 953 with a dilation gap 963 having a value of 3. However, dilation gaps of kernels are not limited to the dilation gaps 961 through 963 of FIG. 9A through FIG. 9C. For example, a kernel may have a dilation gap of k, and k may be an integer greater than or equal to 1.

Also, the image restoration model may include a convolutional layer corresponding to a kernel determined based on a position relationship of sensing elements that receive rays radiated from a point spaced apart from the image sensor by a minimum capturing distance. A kernel corresponding to the minimum capturing distance may have a dilation gap determined based on a maximum disparity that is calculated based on a minimum capturing distance of the image sensor, a distance between a central lens of the image sensor and an outermost lens of the image sensor, and a focal length of a lens. Thus, a kernel with a dilation gap calculated for an example in which a subject is assumed to be at the minimum capturing distance from the image sensor may be referred to as a maximum kernel. The maximum kernel may have a largest dilation gap among dilation gaps that may be used for the image sensor. A dilation gap of the maximum kernel may be determined based on the maximum disparity, and the maximum disparity will be further described below with reference to FIG. 10.

As described above, the image restoration apparatus may restore a high resolution image by combining pixel values sensed by sensing elements in different positions using multiple lenses based on a depth of a subject, using an image restoration model that includes convolutional layers corresponding to a plurality of kernels with different dilation gaps.

Figure 10:
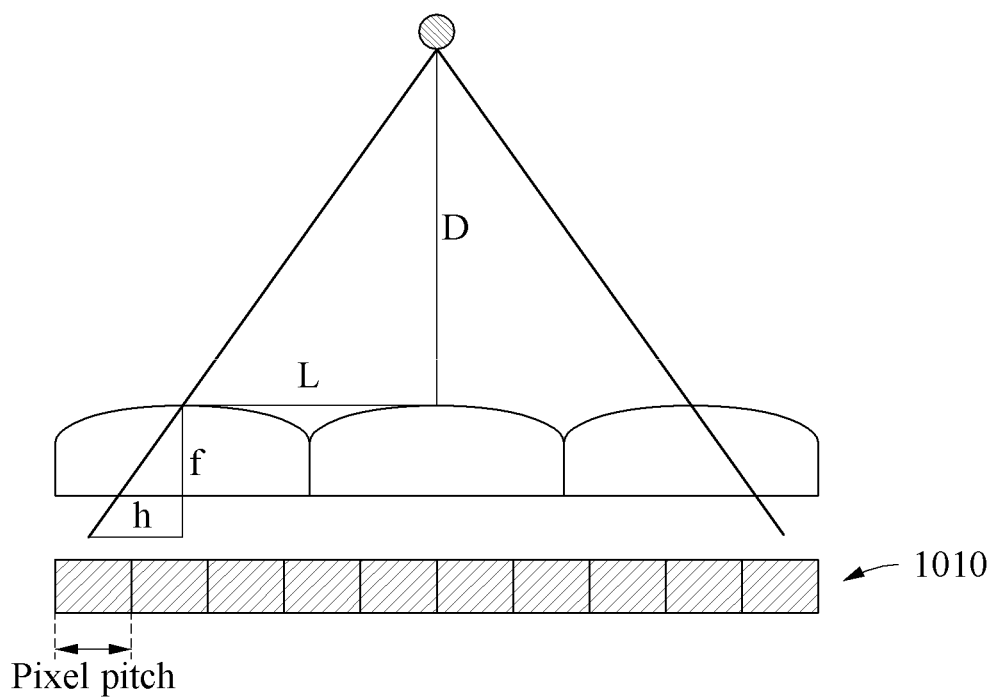
FIG. 10 is a diagram illustrating a maximum disparity according to an example embodiment.

FIG. 10 illustrates a maximum disparity according to an example embodiment.

A disparity may refer to a difference between a central position of a lens and a position at which rays are sensed, and that is variable based on a distance between a subject and sensing elements 1010 included in one lens. For example, an image restoration model may include a convolutional layer corresponding to a kernel with a dilation gap for each of all possible disparities based on a geometric structure, for example, an arrangement of lenses and sensing elements of an image sensor. A number of sensing elements covered by each of the lenses in the image sensor is limited, and thus the disparity may be discretely represented.

The maximum disparity may be a disparity between a sensing element that receives a ray emitted from an infinite focal point and a sensing element that receives a ray emitted from a minimum capturing distance among sensing elements 1010 located in a region covered by an outermost lens in a lens array.

The maximum disparity may be determined based on a minimum capturing distance of the image sensor, a distance between a central lens of the image sensor and an outermost lens of the image sensor, and a focal length of a lens. For example, in FIG. 10, a subject may be assumed to be at a minimum capturing distance D from the image sensor. In FIG. 10, L denotes a distance between a central lens and an outermost lens, and f denotes a focal length of a lens. In this example, the maximum disparity may be calculated by "2×h=2(L×f)/D." The maximum disparity may be expressed in units of a number of pixels by "(2×h)/pixel_pitch." In this example, pixel_pitch is a length indicating a pitch of an arbitrary pixel in an image, and may correspond to, for example, a length or width of each of sensing elements 1010 included in the image sensor.

The image restoration model may include a convolutional layer corresponding to a number of kernels and dilation distances. The number of kernels and dilation distances may be determined based on the maximum disparity.

Figure 11:
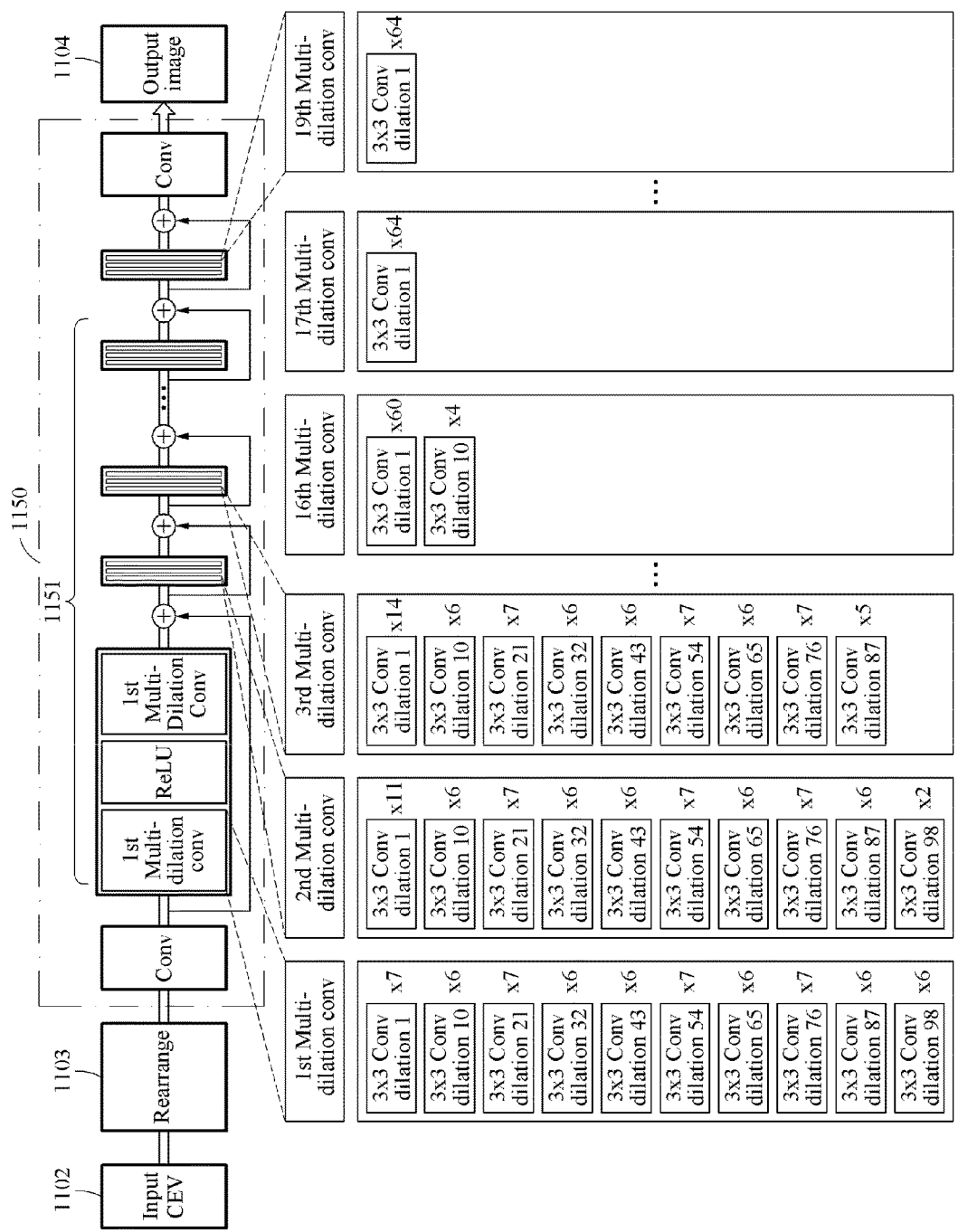
FIG. 11 is a diagram illustrating a structure of an image restoration model according to an example embodiment.

FIG. 11 is a diagram illustrating a structure of an image restoration model according to an example embodiment.

An image restoration apparatus may generate a rearranged image 1103, for example, a target image, from a CEV image 1102. The image restoration apparatus may calculate an output image 1104 from the target image based on an image restoration model 1150.

For example, the image restoration apparatus may calculate an output image based on a convolutional layer having a kernel corresponding to each of a plurality of dilation gaps determined based on an arrangement structure of lenses and sensing elements within an image sensor. The image restoration model 1150 may include a convolutional layer having a kernel with a dilation gap determined based on an arrangement structure of sensing elements and a distance between the image sensor and a point.

The image restoration model 1150 may include convolutional layers corresponding to a plurality of levels 1151. When a distance between a layer and an input side of the image restoration model 1150 decreases, a level corresponding to the layer may decrease. When a distance between a layer and an output side of the image restoration model 1150 decreases, a level corresponding to the layer may increase.

Also, the image restoration model 1150 may include a convolutional layer corresponding to each of kernels with different dilation gaps. The image restoration model 1150 may include convolutional layers corresponding to a plurality of kernels with the same dilation gap. For example, in FIG. 11, a first convolutional layer, which is shown as 1st multi-dilation cony, may include various dilation gaps of a kernel with the same size, for example, 3×3. The first convolutional layer may include seven kernels with a dilation gap of 1, six kernels with a dilation gap of 10, seven kernels with a dilation gap of 21, six kernels with a dilation gap of 32, six kernels with a dilation gap of 43, seven kernels with a dilation gap of 54, six kernels with a dilation gap of 65, seven kernels with a dilation gap of 76, six kernels with a dilation gap of 87, and six kernels with a dilation gap of 98. Thus, the kernels of the first convolutional layer may have various dilation gaps, for example, 1 through 98, and the image restoration model 1150 may extract a plurality of feature maps for each of the dilation gaps. For example, the image restoration model 1150 may extract seven feature maps corresponding to kernels with the dilation gap of 1.

Although a layer of each level includes a convolutional layer on an input side and a convolutional layer on an output side and a ReLU layer is included between the two convolutional layers, embodiments are not limited thereto.

The image restoration model 1150 may include convolutional layers corresponding to kernels with various dilation gaps from an upper layer to a lower layer, and may include convolutional layers corresponding to kernels with kernels with reduced dilation gaps from a lower layer to an upper layer. For example, in the image restoration model 1150, a size of a dilation gap and a number of dilation gaps of each of kernels corresponding to convolutional layers may gradually decrease from a lower layer to an upper layer. For example, when a second convolutional layer, which is shown as 2nd multi-dilation cony, is compared to the first convolutional layer, a number of kernels with a dilation gap of 98 may be reduced from six to two and a number of kernels with a dilation gap of 1 may be increased from 7 to 11. Also, a dilation gap of a kernel may gradually decrease when a level of a layer increases. A nineteenth convolutional layer, which is shown as 19th multi-dilation cony, as a last convolution layer may include 64 kernels with a dilation gap of 1. Thus, layers of the image restoration model 1150 may be designed so that a dilation gap of a kernel may be gradually reduced while maintaining a dimension of data. An upper layer may cover a wider pixel region.

The image restoration apparatus may extract feature data from a target image based on the above-described convolutional layer. The image restoration apparatus may generate an output image from the feature data based on remaining layers of the image restoration model 1150. For example, the image restoration apparatus may propagate the target image from a lower layer to an upper layer in the image restoration model 1150, to finally generate the output image. As the target image is propagated from the lower layer to the upper layer in the image restoration model 1150, more abstract features may be extracted. In FIG. 11, a convolutional layer corresponding to each level in the image restoration model 1150 may extract a total of 64 feature maps, and the image restoration apparatus may generate an output image from the extracted feature maps.

The image restoration apparatus may restore a high resolution image using kernels with various dilation gaps while maintaining a size of a kernel, even though a number of operations is not increased. Also, the image restoration apparatus may restore a high resolution image even though a depth of each object is not estimated.

Although an image restoration using kernels with various dilation gaps has been described above with reference to FIGS. 1 through 11, an image restoration using a kernel with a single dilation gap is described below with referent to FIG. 12.

Figure 12:
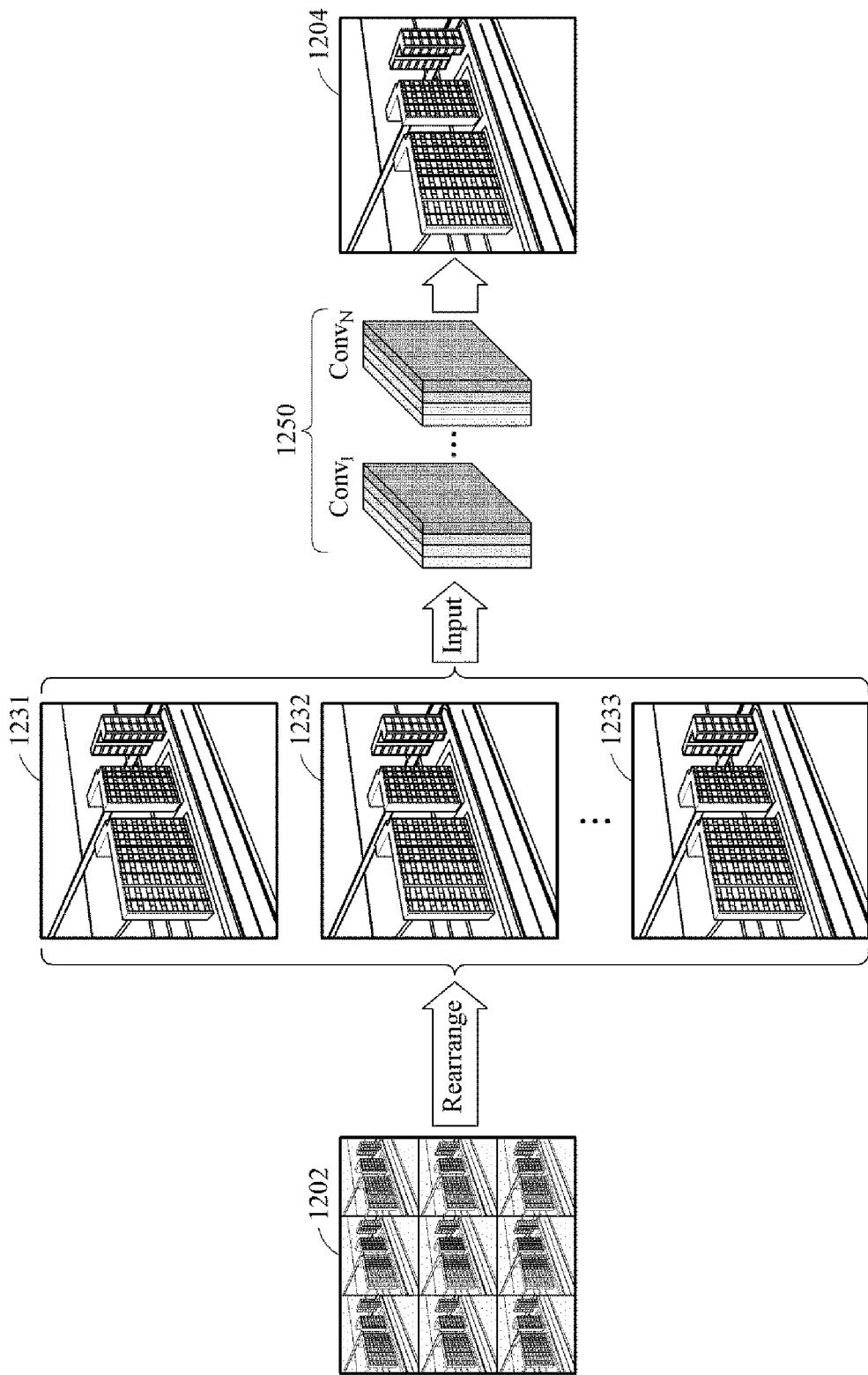
FIG. 12 is a diagram illustrating an image restoration process according to an example embodiment.

FIG. 12 illustrates an image restoration process according to an example embodiment.

Referring to FIG. 12, an image restoration model 1250 may include a convolutional layer corresponding to a kernel with a single dilation gap.

For example, an image restoration apparatus may acquire a plurality of target images, for example, target images 1231, 1232 and 1233, by rearranging an input image for each distance between an image sensor and a target object. As described above, positions of sensing elements that sense similar LF information may be determined based on a distance between a subject and the image sensor. The positions of the sensing elements that sense similar LF information may vary by each disparity based on the distance between the subject and the image sensor. The image restoration apparatus may convert a CEV image 1202 using a rearrangement matrix corresponding to each of a plurality of disparities that may be shown in the image sensor. Because a depth estimation operation is not performed, the image restoration apparatus may generate the target images 1231, 1232 and 1233 from the CEV image 1202 for all cases that may occur based on a depth. Thus, the image restoration apparatus may acquire the same number of target images as a number of disparities that may be shown in the image sensor.

Although the rearrangement matrix used to rearrange the CEV image 1202 obtained by capturing a subject at an infinite focal point from the image sensor has been described above with reference to Equation 4, the image restoration apparatus may rearrange the CEV image 1202 obtained by capturing the subject using rearrangement matrices for each distance corresponding to each disparity in the example of FIG. 12.

The image restoration apparatus may restore an output image 1204 from each of the acquired target images 1231, 1232 and 1233, based on the image restoration model 1250 including convolutional layers. Since the target images 1231, 1232 and 1233 are generated for each disparity, at least one of the target images 1231, 1232 and 1233 may correspond to an accurate depth of each of objects appearing in an actual scene. The image restoration apparatus may calculate the output image 1204 from the plurality of target images, based on the image restoration model 1250 that includes a convolutional layer corresponding to a kernel with a single dilation gap. Although a plurality of objects are present in an actual scene, the image restoration apparatus may extract features of portions corresponding to a depth of each of the objects from each of the target images 1231, 1232 and 1233 based on the trained image restoration model 1250, and may calculate an output image 1204 with a high resolution from the extracted features.

In FIGS. 1 through 11, the image restoration apparatus may restore an image to a high resolution image using kernels set for each disparity that may be shown in the image sensor, even though depth information is absent. In FIG. 12, the image restoration apparatus may determine rearrangement matrices for each disparity that may be shown in the image sensor, and may restore an image to a high resolution image based on the target images 1231, 1232 and 1233 corresponding to different depths generated based on the rearrangement matrices, even though depth information is absent.

FIG. 13 is a flowchart illustrating an image restoration method according to an example embodiment.

Referring to FIG. 13, in operation 1310, an image restoration apparatus may acquire a target image. The image restoration apparatus may acquire a CEV image by capturing an actual scene using an image sensor. The image restoration apparatus may convert the CEV image using a rearrangement matrix, to acquire the target image.

In operation 1320, the image restoration apparatus may restore an output image from the acquired target image, based on an image restoration model that includes a convolutional layer corresponding to a kernel with a dilation gap.

However, embodiments are not limited to the image restoration method of FIG. 13, the image restoration method may be combined with a portion of the operations described above with reference to FIGS. 1 through 12 and performed in parallel or time series.

FIG. 14 is a flowchart illustrating a method of training an image restoration model according to an example embodiment.

Referring to FIG. 14, in operation 1410, a training apparatus may generate a reference input image from training data. For example, the training data may include a pair of a training input and a training output. The training output may be a ground truth given for an arbitrary training input. For example, the training input may be a CEV image, and the training output may be an actual scene corresponding to the CEV image. The training apparatus may convert the training input, for example, a CEV image, using a rearrangement matrix, to generate the reference input image. The reference input image may be a target image obtained by converting the training input using the rearrangement matrix, as described above with reference to FIGS. 4 and 7.

In operation 1420, the training apparatus may train an image restoration model to calculate a reference output image from the reference input image. The image restoration model may include a convolutional layer corresponding to a kernel with a dilation gap. For example, the training apparatus may propagate the reference input image from an input layer to an output layer of the image restoration model, to calculate a temporary output image. In the present disclosure, an image restoration model that is not completely trained may be referred to as a temporary model, and an output of the temporary model may be referred to as a temporary output image. The training apparatus may calculate a loss between the temporary output image and the reference output image. The loss may be calculated by various loss functions and is not limited to a predetermined function. The training apparatus may update a parameter, for example, a connection weight, of the image restoration model, to minimize the loss. The training apparatus may repeat a process of calculating the temporary output image and updating the parameter of the image restoration model based on the temporary output image, until the loss converges.

When the loss converges, the training apparatus may terminate training of the image restoration model, and may store the completely trained image restoration model and a parameter corresponding to the image restoration model.

Figure 15:
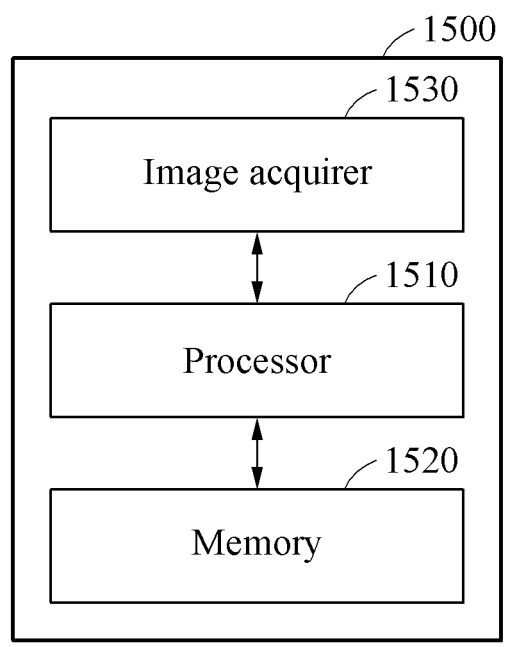
FIG. 15 is a block diagram illustrating a configuration of an image restoration apparatus according to an example embodiment.

FIG. 15 is a block diagram illustrating a configuration of an image restoration apparatus according to an example embodiment.

Referring to FIG. 15, an image restoration apparatus 1500 may include a processor 1510, a memory 1520, and an image acquirer 1530.

The processor 1510 may restore an output image from an acquired target image based on an image restoration model that includes convolutional layers having kernels with dilation gaps. However, an operation of the processor 1510 is not limited thereto, and the processor 1510 may perform the operations described above with reference to FIGS. 1 through 14.

The memory 1520 may store an image restoration model and a parameter. The image restoration model may be a model that is completely trained. Also, the memory 1520 may temporarily or permanently store data used to perform an image restoration method. For example, the memory 1520 may store a target image acquired by the image acquirer 1530, an output image, or feature data output from each convolutional layer.

The image acquirer 1530 may acquire the target image. For example, the image acquirer 1530 may include an image sensor configured to capture a CEV image. The image sensor may have a structure described above with reference to FIGS. 1 and 2.

Figure 16:
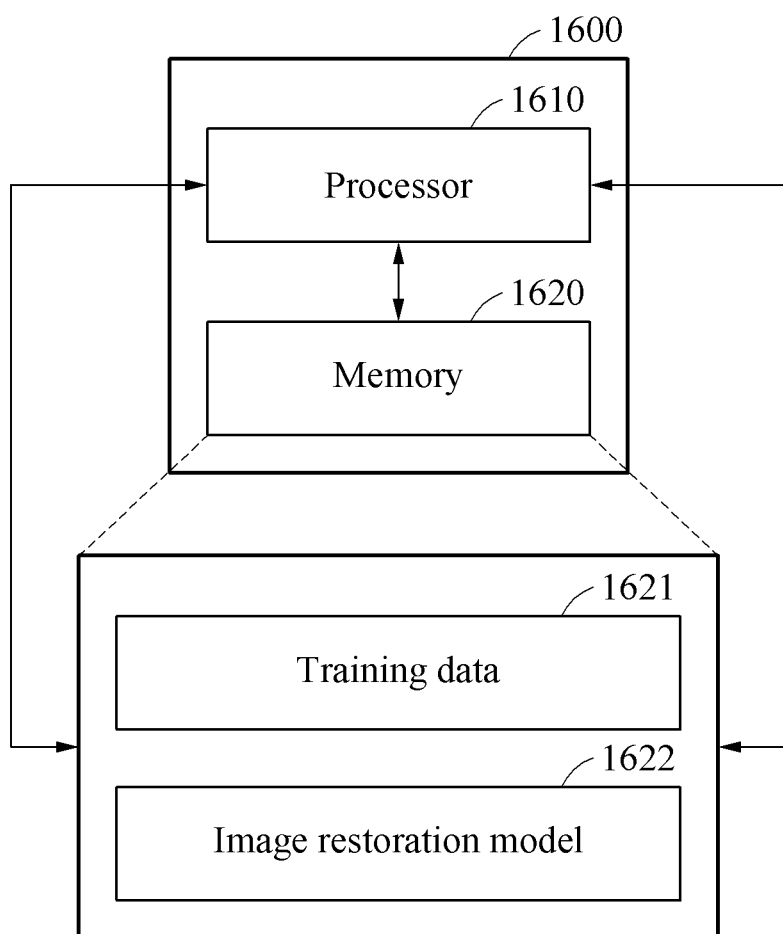
FIG. 16 is a block diagram illustrating a configuration of a training apparatus according to an example embodiment.

FIG. 16 is a block diagram illustrating a configuration of a training apparatus according to an example embodiment.

Referring to FIG. 16, a training apparatus 1600 may include a processor 1610 and a memory 1620.

The processor 1610 may load training data 1621 and an image restoration model 1622 from the memory 1620. The processor 1610 may generate a reference input image from a training input using a rearrangement matrix. The processor 1610 may train the image restoration model 1622 to calculate a training output from the reference input image. For example, the processor 1610 may calculate a temporary output image by propagating the reference input image to the image restoration model 1622, and may update a parameter of the image restoration model 1622 to minimize a loss between the temporary output image and a reference output image.

The reference input image may be obtained by rearranging pixels with a high correlation between LF information using the rearrangement matrix so that the pixels are adjacent to each other, and accordingly the training apparatus 1600 may train the image restoration model 1622 to output an image with a higher resolution based on the reference input image.

Figure 17:
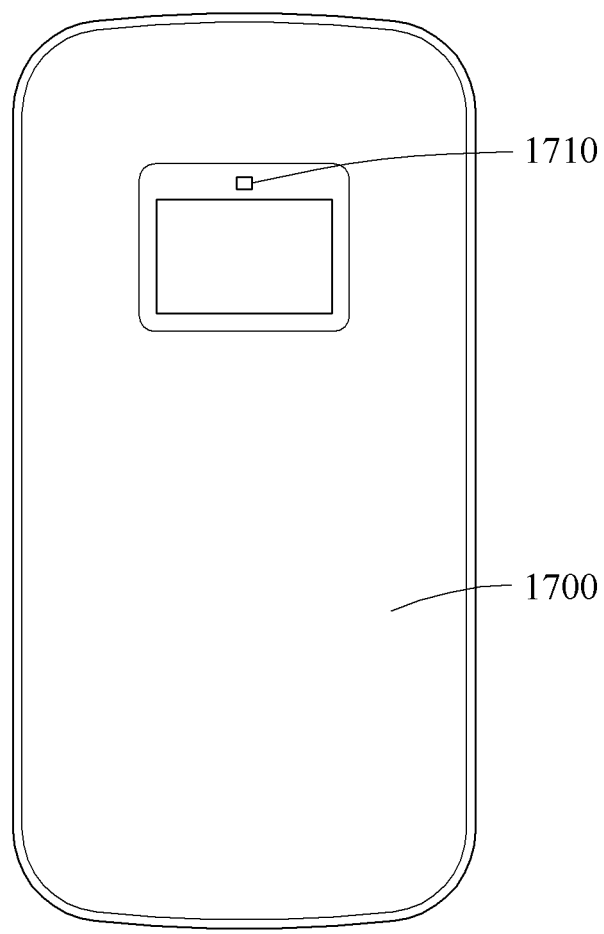
FIGS. 17 and 18 are diagrams illustrating examples of an apparatus in which an image restoration apparatus is implementable according to an example embodiment.
Figure 18:
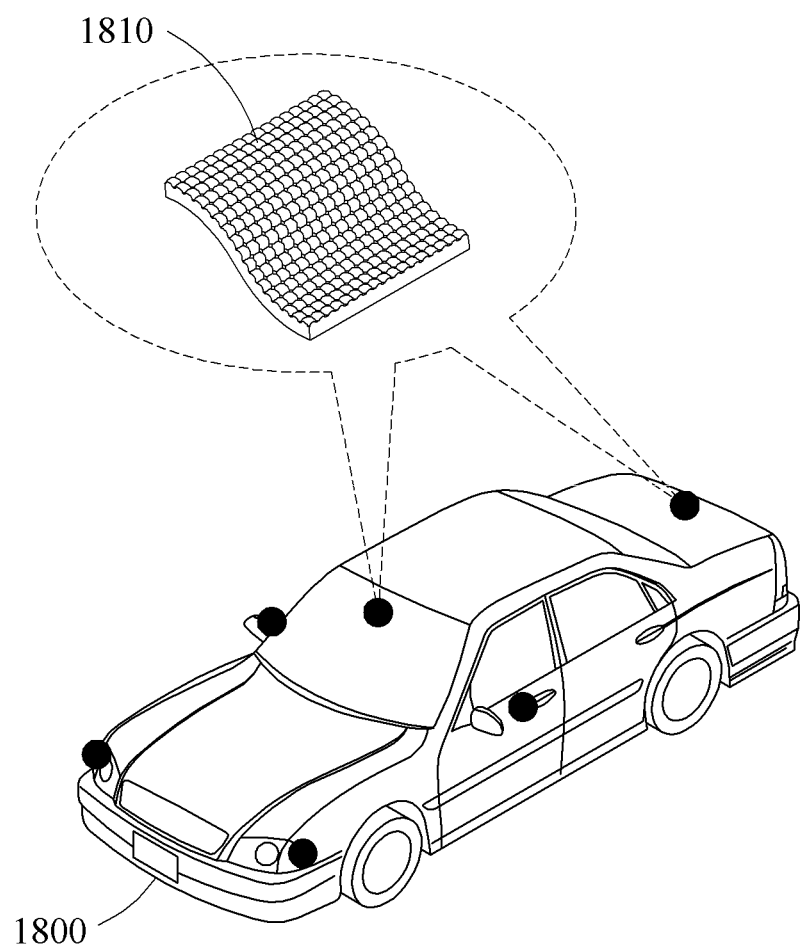

FIGS. 17 and 18 are diagrams illustrating examples of an apparatus in which an image restoration apparatus is implementable according to an example embodiment.

An image restoration apparatus may be applicable to various technical fields. The image restoration apparatus may be designed so that a lens array including a plurality of lenses may be spaced apart from a sensor including a plurality of sensing elements by a relatively small focal length. For example, the image restoration apparatus may be implemented as an ultra thin camera with a large sensor for high-definition capturing. In other words, a thickness of the image sensor may be reduced through a multi-lens array structure. The image restoration apparatus may be implemented as an application processor (AP), a field-programmable gate array (FPGA) or a chip, and may be used as an image signal processor of a camera. The image restoration apparatus may be applied to a front camera or a rear camera of a smartphone. The image restoration apparatus may have a structure in which a large full frame sensor and a microlens array are combined, and may be applied to a camera of a mobile phone. Also, the image restoration apparatus may have a thin structure or a curved structure and may be implemented for vehicles.

Referring to FIG. 17, an image restoration apparatus 1710 may be implemented as a front camera or a rear camera of a smartphone device 1700. A sensor of the image restoration apparatus 1710 may be implemented as a full-frame sensor. Also, a lens array may be implemented as a micro lens array.

Referring to FIG. 18, an image restoration apparatus 1810 may be implemented as a curved front camera or rear camera of a vehicle 1800. However, embodiments are not limited thereto. The image restoration apparatus 1810 may be used in, for example, a DSLR camera, a drone, a closed-circuit television (CCTV), a webcam camera, a panoramic camera, a camera for movies or broadcasts, or a virtual reality/augmented reality (VR/AR) camera. Also, the image restoration apparatus 1810 may be applicable to various fields, for example, a flexible/stretchable camera, a compound-eye camera, or a contact lens type camera.

The image restoration apparatus may also be applicable to a multi-frame super resolution image restoration for increasing a resolution of a video image based on information about a plurality of consecutive frames that are captured.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. Therefore, the scope of the disclosure is defined not by the detailed description, but by the claims and their equivalents, and all variations within the scope of the claims and their equivalents are to be construed as being included in the disclosure.

What is claimed is:

1. An image restoration method comprising:
   acquiring a target image by rearranging an input image of an object; and
   restoring an output image from the acquired target image, based on an image restoration model comprising a convolutional layer corresponding to a plurality of kernels corresponding to a plurality of dilation gaps, respectively,
   wherein the plurality of dilation gaps are determined based on a configuration of lenses included in an image sensor and a plurality of sensing elements included in the image sensor.

2. An image restoration method comprising:
   acquiring a target image by rearranging an input image of an object; and
   restoring an output image from the acquired target image, based on an image restoration model comprising a convolutional layer corresponding to a kernel having a dilation gap,
   wherein the dilation gap is determined based on a configuration of sensing elements included in an image sensor and a distance between the image sensor and a point of the object spaced apart from the image sensor.

3. The image restoration method of claim 1, wherein a kernel of the plurality of kernels is determined based on a position relationship of the plurality of sensing elements included in the image sensor that are configured to receive rays radiated from a point of the object spaced apart from the image sensor by a distance greater than a threshold distance.

4. The image restoration method of claim 1, wherein the image restoration model comprises a convolutional layer corresponding to a kernel of the plurality of kernels determined based on a position relationship of the plurality of sensing elements included in the image sensor that are configured to receive rays radiated from a point spaced apart from the image sensor by a minimum capturing distance.

5. The image restoration method of claim 4, wherein a kernel corresponding to the minimum capturing distance has a dilation gap corresponding to a maximum disparity,
wherein the maximum disparity is determined based on the minimum capturing distance of the image sensor, a distance between a central lens of the image sensor and an outermost lens of the image sensor, and a focal length of a lens.

6. The image restoration method of claim 1, wherein the image restoration model further comprises a plurality of convolutional layers corresponding to a plurality of levels, respectively.

7. The image restoration method of claim 1, wherein the image restoration model further comprises a plurality of convolutional layers corresponding to the plurality of kernels having different dilation gaps, respectively.

8. The image restoration method of claim 1, wherein the restoring the output image comprises:
extracting feature data from the target image based on the convolutional layer; and
generating the output image from feature data based on layers other than the convolutional layer that are included in the image restoration model.

9. The image restoration method of claim 1, wherein the image restoration model further comprises a plurality of convolutional layers corresponding to the plurality of kernels having a same dilation gap.

10. The image restoration method of claim 1, wherein the restoring the output image comprises restoring the output image from the target image based on the image restoration model that is trained to output a reference output image in response to an input of a reference input image obtained by rearranging a compound eye vision (CEV) image.

11. The image restoration method of claim 1, wherein the acquiring the target image comprises:
acquiring a compound eye vision (CEV) image; and
generating the target image by rearranging the CEV image.

12. The image restoration method of claim 11, wherein the acquiring the CEV image comprises acquiring the CEV image based on an intensity of rays received by the plurality of sensing elements through a plurality of lenses provided in an array.

13. The image restoration method of claim 12, wherein the plurality of lenses are arranged eccentrically with respect to the plurality of sensing elements.

14. The image restoration method of claim 12, wherein the generating of the target image comprises rearranging the CEV image based on light field information sensed by the plurality of sensing elements.

15. The image restoration method of claim 14, wherein the rearranging the CEV image comprises rearranging pixels of the CEV image so that pixels of the plurality of sensing elements that sense similar LF information among the plurality of sensing elements are adjacent to each other.

16. The image restoration method of claim 15, wherein the rearranging the pixels of the CEV image comprises:
determining points of the object that emit an LF sensed by each of the plurality of sensing elements based on a position relationship between the plurality of sensing elements and rays radiated from points of the object that are spaced apart from the image sensor by a distance greater than a threshold distance; and
rearranging pixels corresponding to LF information emitted from points that are adjacent to each other so that the rearranged pixels are adjacent to each other.

17. A non-transitory computer-readable storage medium storing instructions which are configured to be executed by a processor to cause the processor to perform the method of claim 1.

18. An image restoration apparatus comprising:
an image acquirer configured to acquire a target image and including lenses and a plurality of sensing elements; and
a processor configured to restore an output image from the acquired target image, based on an image restoration model comprising a convolutional layer corresponding to a plurality of kernels corresponding to a plurality of dilation gaps, respectively,
wherein the plurality of dilation gaps are determined based on a configuration of the lenses and the plurality of sensing elements.

19. An image restoration method comprising:
acquiring a plurality of target images by rearranging an input image of a target object corresponding to each distance between an image sensor and the target object; and
restoring an output image from each of the plurality of acquired target images, based on an image restoration model comprising convolutional layers corresponding to a plurality of kernels corresponding to a plurality of dilation gaps, respectively,
wherein the plurality of dilation gaps are determined based on a configuration of lenses included in the image sensor and a plurality of sensing elements included in the image sensor.

* * * * *